(12) United States Patent
Ward, III et al.

(10) Patent No.: US 7,941,818 B2
(45) Date of Patent: *May 10, 2011

(54) SYSTEM AND METHOD FOR UTILIZING EPG DATABASE FOR MODIFYING ADVERTISEMENTS

(75) Inventors: Thomas E. Ward, III, Weston, MA (US); Ted Nesson, Bedford, MA (US)

(73) Assignee: Index Systems, Inc., Los Angeles, CA (US)

( * ) Notice: Subject to any disclaimer, the term of this patent is extended or adjusted under 35 U.S.C. 154(b) by 630 days.

This patent is subject to a terminal disclaimer.

(21) Appl. No.: 11/888,896

(22) Filed: Aug. 1, 2007

(65) Prior Publication Data

US 2008/0077958 A1 Mar. 27, 2008

Related U.S. Application Data

(63) Continuation of application No. 10/453,388, filed on Jun. 3, 2003, now Pat. No. 7,266,833, which is a continuation of application No. 09/604,038, filed on Jun. 27, 2000, now abandoned.

(60) Provisional application No. 60/141,331, filed on Jun. 28, 1999.

(51) Int. Cl.
*G06F 3/00* (2006.01)
*G06F 13/00* (2006.01)
*H04N 5/445* (2006.01)

(52) U.S. Cl. ............................. 725/42; 725/43; 725/134

(58) Field of Classification Search .................... 725/39, 725/41–43, 51, 134, 139–140, 151–152, 725/142; 348/563, 589, 600
See application file for complete search history.

(56) References Cited

U.S. PATENT DOCUMENTS

| 3,440,427 A | 4/1969 | Kammer |
| 3,492,577 A | 1/1970 | Reiter et al. |
| 3,493,674 A | 2/1970 | Houghton |
| 3,729,581 A | 4/1973 | Anderson |
| 3,833,757 A | 9/1974 | Kirk, Jr. et al. |
| 3,891,792 A | 6/1975 | Kimura |
| 3,936,868 A | 2/1976 | Thorpe |

(Continued)

FOREIGN PATENT DOCUMENTS

AU 56198-98 7/1998

(Continued)

OTHER PUBLICATIONS

U.S. Appl. No. 09/330,792, filed Jun. 11, 1999, Knudson et al.

(Continued)

*Primary Examiner* — Ngoc Vu
(74) *Attorney, Agent, or Firm* — Ropes & Gray LLP

(57) ABSTRACT

A system and method for utilizing data stored in an EPG database for modifying advertisement information. In this way, a service provider and/or an advertiser can transmit a single advertisement to all the television stations regardless of their geographic location and other user specific information, and need not re-transmit the advertisement even if there is a change in the show's program description. When the advertisement is displayed, the correct updated information is retrieved from the EPG database and inserted into the advertisement.

In one aspect, the present invention describes a method for modifying an advertisement in an EPG comprising the steps of: storing television schedule information in a first database; storing advertisement information in a second database; incorporating a portion of the television schedule information into a portion of the advertisement information to form a modified advertisement; and displaying the modified advertisement on a screen.

18 Claims, 8 Drawing Sheets

U.S. PATENT DOCUMENTS

| | | |
|---|---|---|
| 3,996,583 A | 12/1976 | Hutt et al. |
| 4,004,085 A | 1/1977 | Makino et al. |
| 4,016,361 A | 4/1977 | Pandey |
| 4,026,555 A | 5/1977 | Kirschner et al. |
| 4,031,548 A | 6/1977 | Kato et al. |
| 4,052,719 A | 10/1977 | Hutt et al. |
| 4,058,830 A | 11/1977 | Guinet et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,271,532 A | 6/1981 | Wine |
| 4,276,597 A | 6/1981 | Dissly et al. |
| 4,283,787 A | 8/1981 | Chambers |
| 4,288,809 A | 9/1981 | Yabe |
| 4,290,142 A | 9/1981 | Schnee et al. |
| 4,305,101 A | 12/1981 | Yarbrough et al. |
| 4,329,684 A | 5/1982 | Monteath et al. |
| 4,331,974 A | 5/1982 | Cogswell et al. |
| 4,337,480 A | 6/1982 | Bourassin et al. |
| 4,337,483 A | 6/1982 | Guillou |
| 4,344,090 A | 8/1982 | Belisomi et al. |
| 4,367,559 A | 1/1983 | Tults |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,976 A | 1/1985 | Swanson et al. |
| 4,510,623 A | 4/1985 | Bonneau et al. |
| 4,520,404 A | 5/1985 | Von Kohorn |
| 4,523,228 A | 6/1985 | Banker |
| 4,527,194 A | 7/1985 | Sirazi |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,620,229 A | 10/1986 | Amano et al. |
| 4,622,545 A | 11/1986 | Atkinson |
| 4,635,109 A | 1/1987 | Comeau |
| 4,635,121 A | 1/1987 | Hoffman |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,712,105 A | 12/1987 | Kohler |
| 4,718,107 A | 1/1988 | Hayes |
| RE32,632 E | 3/1988 | Atkinson |
| 4,745,549 A | 5/1988 | Hashimoto |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,847,604 A | 7/1989 | Doyle |
| 4,847,700 A | 7/1989 | Freeman |
| 4,857,999 A | 8/1989 | Welsh |
| 4,862,268 A | 8/1989 | Campbell et al. |
| 4,864,429 A | 9/1989 | Eigeldinger et al. |
| 4,873,623 A | 10/1989 | Lane et al. |
| 4,882,732 A | 11/1989 | Kaminaga |
| 4,884,223 A | 11/1989 | Ingle et al. |
| 4,888,796 A | 12/1989 | Olivo, Jr. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |
| 4,939,507 A | 7/1990 | Beard et al. |
| 4,959,720 A | 9/1990 | Duffield et al. |
| 4,963,994 A | 10/1990 | Levine |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,992,940 A | 2/1991 | Dworkin |
| 4,995,078 A | 2/1991 | Monslow et al. |
| 4,996,642 A | 2/1991 | Hey |
| 4,998,171 A | 3/1991 | Kim et al. |
| 5,003,384 A | 3/1991 | Durden et al. |
| 5,008,853 A | 4/1991 | Bly et al. |
| 5,014,125 A | 5/1991 | Pocock et al. |
| 5,027,400 A | 6/1991 | Baji et al. |
| 5,036,314 A | 7/1991 | Barillari et al. |
| 5,038,211 A | 8/1991 | Hallenbeck |

| | | | | | | |
|---|---|---|---|---|---|---|
| 5,045,947 A | 9/1991 | Beery | | 5,359,601 A | 10/1994 | Wasilewski et al. |
| 5,047,867 A | 9/1991 | Strubbe et al. | | 5,365,282 A | 11/1994 | Levine |
| 5,058,160 A | 10/1991 | Banker et al. | | 5,367,316 A | 11/1994 | Ikezaki |
| 5,062,060 A | 10/1991 | Kolnick | | 5,367,330 A | 11/1994 | Haave et al. |
| 5,068,734 A | 11/1991 | Beery | | 5,373,288 A | 12/1994 | Blahut |
| 5,072,412 A | 12/1991 | Henderson, Jr. et al. | | 5,374,951 A | 12/1994 | Welsh |
| 5,075,771 A | 12/1991 | Hashimoto | | 5,377,317 A | 12/1994 | Bates et al. |
| 5,083,800 A | 1/1992 | Lockton | | 5,377,319 A | 12/1994 | Kitahara et al. |
| 5,091,785 A | 2/1992 | Canfield et al. | | 5,382,983 A | 1/1995 | Kwoh et al. |
| 5,093,921 A | 3/1992 | Bevins, Jr. | | 5,384,910 A | 1/1995 | Torres |
| 5,099,319 A | 3/1992 | Esch et al. | | 5,387,945 A | 2/1995 | Takeuchi |
| 5,103,314 A | 4/1992 | Keenan | | 5,398,074 A | 3/1995 | Duffield et al. |
| 5,105,184 A | 4/1992 | Pirani et al. | | 5,404,393 A | 4/1995 | Remillard |
| 5,119,188 A | 6/1992 | McCalley et al. | | 5,410,326 A | 4/1995 | Goldstein |
| 5,121,476 A | 6/1992 | Yee | | 5,410,343 A | 4/1995 | Coddington et al. |
| 5,123,046 A | 6/1992 | Levine | | 5,410,344 A | 4/1995 | Graves et al. |
| 5,126,851 A | 6/1992 | Yoshimura | | 5,410,367 A | 4/1995 | Zahavi et al. |
| 5,148,154 A | 9/1992 | MacKay et al. | | 5,412,720 A | 5/1995 | Hoarty |
| 5,151,782 A | 9/1992 | Ferraro | | 5,416,508 A | 5/1995 | Sakuma et al. |
| 5,151,789 A | 9/1992 | Young | | 5,424,770 A | 6/1995 | Schmelzer et al. |
| 5,155,591 A | 10/1992 | Wachob | | 5,425,101 A | 6/1995 | Woo et al. |
| 5,155,806 A | 10/1992 | Hoeber et al. | | 5,432,561 A | 7/1995 | Strubbe |
| 5,157,768 A | 10/1992 | Hoeber et al. | | 5,434,626 A | 7/1995 | Hayashi et al. |
| 5,161,023 A | 11/1992 | Keenan | | 5,436,676 A | 7/1995 | Pint et al. |
| 5,162,905 A | 11/1992 | Itoh et al. | | 5,438,372 A | 8/1995 | Tsumori et al. |
| 5,170,388 A | 12/1992 | Endoh | | 5,440,678 A | 8/1995 | Eisen et al. |
| 5,172,111 A | 12/1992 | Olivo, Jr. | | 5,444,499 A | 8/1995 | Saitoh |
| 5,177,604 A | 1/1993 | Martinez | | 5,446,919 A | 8/1995 | Wilkins |
| 5,179,654 A | 1/1993 | Richards et al. | | 5,452,012 A | 9/1995 | Saitoh |
| 5,195,092 A | 3/1993 | Wilson et al. | | 5,459,522 A | 10/1995 | Pint |
| 5,200,823 A | 4/1993 | Yoneda et al. | | 5,461,415 A | 10/1995 | Wolf et al. |
| 5,204,897 A | 4/1993 | Wyman | | 5,465,113 A | 11/1995 | Gilboy |
| 5,206,722 A | 4/1993 | Kwan | | 5,465,385 A | 11/1995 | Ohga et al. |
| 5,210,611 A | 5/1993 | Yee et al. | | 5,469,206 A | 11/1995 | Strubbe et al. |
| 5,212,553 A | 5/1993 | Maruoka | | 5,477,262 A | 12/1995 | Banker et al. |
| 5,214,622 A | 5/1993 | Nemoto et al. | | 5,479,266 A | 12/1995 | Young et al. |
| 5,216,515 A | 6/1993 | Steele et al. | | 5,479,268 A | 12/1995 | Young et al. |
| 5,220,420 A | 6/1993 | Hoarty et al. | | 5,479,497 A | 12/1995 | Kovarik |
| 5,223,924 A | 6/1993 | Strubbe | | 5,481,296 A | 1/1996 | Cragun et al. |
| 5,227,874 A | 7/1993 | Von Kohorn | | 5,483,278 A | 1/1996 | Strubbe et al. |
| 5,231,493 A | 7/1993 | Apitz | | 5,485,197 A | 1/1996 | Hoarty |
| RE34,340 E | 8/1993 | Freeman | | 5,485,219 A | 1/1996 | Woo |
| 5,233,423 A | 8/1993 | Jernigan et al. | | 5,485,221 A | 1/1996 | Banker et al. |
| 5,233,654 A | 8/1993 | Harvey et al. | | 5,488,409 A | 1/1996 | Yuen et al. |
| 5,235,415 A | 8/1993 | Bonicel et al. | | 5,495,295 A | 2/1996 | Long |
| 5,236,199 A | 8/1993 | Thompson, Jr. | | 5,502,504 A | 3/1996 | Marshall et al. |
| 5,237,411 A | 8/1993 | Fink et al. | | 5,515,098 A | 5/1996 | Carles |
| 5,237,417 A | 8/1993 | Hayashi et al. | | 5,523,794 A | 6/1996 | Mankovitz et al. |
| 5,237,418 A | 8/1993 | Kaneko | | 5,523,796 A | 6/1996 | Marshall et al. |
| 5,239,540 A | 8/1993 | Rovira et al. | | 5,524,195 A | 6/1996 | Clanton, III et al. |
| 5,245,420 A | 9/1993 | Harney et al. | | 5,526,034 A | 6/1996 | Hoarty et al. |
| 5,247,347 A | 9/1993 | Litteral et al. | | 5,528,304 A | 6/1996 | Cherrick et al. |
| 5,247,364 A | 9/1993 | Banker et al. | | 5,532,735 A | 7/1996 | Blahut et al. |
| 5,247,580 A | 9/1993 | Kimura et al. | | 5,532,754 A | 7/1996 | Young et al. |
| 5,253,066 A | 10/1993 | Vogel | | 5,534,911 A | 7/1996 | Levitan |
| 5,253,067 A | 10/1993 | Chaney et al. | | 5,537,141 A | 7/1996 | Harper et al. |
| 5,260,778 A | 11/1993 | Kauffman et al. | | 5,539,479 A | 7/1996 | Bertram |
| 5,260,788 A | 11/1993 | Takano et al. | | 5,539,822 A | 7/1996 | Lett |
| 5,260,999 A | 11/1993 | Wyman | | 5,541,662 A | 7/1996 | Adams et al. |
| 5,283,639 A | 2/1994 | Esch et al. | | 5,541,738 A | 7/1996 | Mankovitz |
| 5,283,819 A | 2/1994 | Glick et al. | | 5,550,576 A | 8/1996 | Klosterman |
| 5,301,028 A | 4/1994 | Banker et al. | | 5,557,338 A | 9/1996 | Maze et al. |
| 5,307,173 A | 4/1994 | Yuen et al. | | 5,557,721 A | 9/1996 | Fite et al. |
| 5,311,423 A | 5/1994 | Clark | | 5,559,548 A | 9/1996 | Davis et al. |
| 5,313,282 A | 5/1994 | Hayashi | | 5,559,549 A | 9/1996 | Hendricks et al. |
| 5,317,403 A | 5/1994 | Keenan | | 5,559,550 A | 9/1996 | Mankovitz |
| 5,319,445 A | 5/1994 | Fitts | | 5,559,942 A | 9/1996 | Gough et al. |
| 5,323,234 A | 6/1994 | Kawasaki | | 5,561,471 A | 10/1996 | Kim et al. |
| 5,323,240 A | 6/1994 | Amano et al. | | 5,570,295 A | 10/1996 | Isenberg et al. |
| 5,325,183 A | 6/1994 | Rhee | | 5,572,442 A | 11/1996 | Schulhof et al. |
| 5,325,423 A | 6/1994 | Lewis | | 5,574,962 A | 11/1996 | Fardeau et al. |
| 5,335,277 A | 8/1994 | Harvey et al. | | 5,579,055 A | 11/1996 | Hamilton et al. |
| 5,343,239 A | 8/1994 | Lappington et al. | | 5,581,479 A | 12/1996 | McLaughlin et al. |
| 5,347,167 A | 9/1994 | Singh | | 5,582,364 A | 12/1996 | Trulin et al. |
| 5,347,632 A | 9/1994 | Filepp et al. | | 5,583,560 A | 12/1996 | Florin et al. |
| 5,351,075 A | 9/1994 | Herz et al. | | 5,583,563 A | 12/1996 | Wanderscheid et al. |
| 5,353,121 A | 10/1994 | Young et al. | | 5,584,025 A | 12/1996 | Keithley et al. |
| 5,357,276 A | 10/1994 | Banker et al. | | 5,585,838 A | 12/1996 | Lawler et al. |
| 5,359,367 A | 10/1994 | Stockill | | 5,585,865 A | 12/1996 | Amano et al. |

| | | | | | |
|---|---|---|---|---|---|
| 5,585,866 A | 12/1996 | Miller et al. | 5,731,844 A | 3/1998 | Rauch et al. |
| 5,589,892 A | 12/1996 | Knee et al. | 5,734,444 A | 3/1998 | Yoshinobu |
| 5,592,551 A | 1/1997 | Lett et al. | 5,734,853 A | 3/1998 | Hendricks et al. |
| 5,594,509 A | 1/1997 | Florin et al. | 5,734,893 A | 3/1998 | Li et al. |
| 5,596,373 A | 1/1997 | White et al. | 5,737,028 A | 4/1998 | Bertram et al. |
| 5,600,364 A | 2/1997 | Hendricks et al. | 5,737,030 A | 4/1998 | Hong et al. |
| 5,600,366 A | 2/1997 | Schulman | 5,740,549 A | 4/1998 | Reilly et al. |
| 5,600,573 A | 2/1997 | Hendricks et al. | 5,751,282 A | 5/1998 | Girard et al. |
| 5,602,582 A | 2/1997 | Wanderscheid et al. | 5,752,159 A | 5/1998 | Faust et al. |
| 5,602,596 A | 2/1997 | Claussen et al. | 5,752,160 A | 5/1998 | Dunn |
| 5,602,597 A | 2/1997 | Bertram | 5,754,258 A | 5/1998 | Hanaya et al. |
| 5,602,598 A | 2/1997 | Shintani | 5,754,771 A | 5/1998 | Epperson et al. |
| 5,606,374 A | 2/1997 | Bertram | 5,754,939 A | 5/1998 | Herz et al. |
| 5,610,653 A | 3/1997 | Abecassis | 5,757,417 A | 5/1998 | Aras et al. |
| 5,617,565 A | 4/1997 | Augenbraun et al. | 5,758,257 A | 5/1998 | Herz et al. |
| 5,619,247 A | 4/1997 | Russo | 5,758,259 A | 5/1998 | Lawler |
| 5,619,249 A | 4/1997 | Billock et al. | 5,760,821 A | 6/1998 | Ellis et al. |
| 5,619,274 A | 4/1997 | Roop et al. | 5,761,372 A | 6/1998 | Yoshinobu et al. |
| 5,621,456 A | 4/1997 | Florin et al. | 5,761,601 A | 6/1998 | Nemirofsky et al. |
| 5,623,613 A | 4/1997 | Rowe et al. | 5,768,528 A | 6/1998 | Stumm |
| 5,627,940 A | 5/1997 | Rohra et al. | 5,774,170 A | 6/1998 | Hite et al. |
| 5,629,733 A | 5/1997 | Youman et al. | 5,774,357 A | 6/1998 | Hoffberg et al. |
| 5,630,119 A | 5/1997 | Aristides et al. | 5,774,534 A | 6/1998 | Mayer |
| 5,631,995 A | 5/1997 | Weissensteiner et al. | 5,774,887 A | 6/1998 | Wolff et al. |
| 5,633,683 A | 5/1997 | Rosengren et al. | 5,778,182 A | 7/1998 | Cathey et al. |
| 5,635,978 A | 6/1997 | Alten et al. | 5,781,226 A | 7/1998 | Sheehan |
| 5,635,979 A | 6/1997 | Kostreski et al. | 5,781,245 A | 7/1998 | Van Der Weij et al. |
| 5,635,989 A | 6/1997 | Rothmuller | 5,781,246 A | 7/1998 | Alten et al. |
| 5,636,346 A | 6/1997 | Saxe | 5,784,258 A | 7/1998 | Quinn |
| 5,640,501 A | 6/1997 | Turpin | 5,790,202 A | 8/1998 | Kummer et al. |
| 5,640,577 A | 6/1997 | Scharmer | 5,790,426 A | 8/1998 | Robinson |
| 5,642,153 A | 6/1997 | Chaney et al. | 5,793,438 A | 8/1998 | Bedard |
| 5,648,813 A | 7/1997 | Tanigawa et al. | 5,793,964 A | 8/1998 | Rogers et al. |
| 5,648,824 A | 7/1997 | Dunn et al. | 5,798,785 A | 8/1998 | Hendricks et al. |
| 5,650,826 A | 7/1997 | Eitz | 5,801,747 A | 9/1998 | Bedard |
| 5,650,831 A | 7/1997 | Farwell | 5,801,785 A | 9/1998 | Crump et al. |
| 5,652,613 A | 7/1997 | Lazarus et al. | 5,801,787 A | 9/1998 | Schein et al. |
| 5,652,615 A | 7/1997 | Bryant et al. | 5,802,284 A | 9/1998 | Karlton et al. |
| 5,654,748 A | 8/1997 | Matthews, III | 5,805,154 A | 9/1998 | Brown |
| 5,654,886 A | 8/1997 | Zereski, Jr. et al. | 5,805,167 A | 9/1998 | van Cruyningen |
| 5,657,072 A | 8/1997 | Aristides et al. | 5,805,235 A | 9/1998 | Bedard |
| 5,657,091 A | 8/1997 | Bertram | 5,805,763 A | 9/1998 | Lawler et al. |
| 5,659,350 A | 8/1997 | Hendricks et al. | 5,805,804 A | 9/1998 | Laursen et al. |
| 5,659,366 A | 8/1997 | Kerman | 5,808,608 A | 9/1998 | Young et al. |
| 5,661,516 A | 8/1997 | Carles | 5,808,694 A | 9/1998 | Usui et al. |
| 5,661,517 A | 8/1997 | Budow et al. | 5,809,204 A | 9/1998 | Young et al. |
| 5,663,757 A | 9/1997 | Morales | 5,812,205 A | 9/1998 | Milnes et al. |
| 5,664,111 A | 9/1997 | Nahan et al. | 5,815,145 A | 9/1998 | Matthews, III |
| 5,666,293 A | 9/1997 | Metz et al. | 5,815,671 A | 9/1998 | Morrison |
| 5,666,498 A | 9/1997 | Amro | 5,818,438 A | 10/1998 | Howe et al. |
| 5,666,645 A | 9/1997 | Thomas et al. | 5,818,439 A | 10/1998 | Nagasaka et al. |
| 5,671,276 A | 9/1997 | Eyer et al. | 5,818,441 A | 10/1998 | Throckmorton et al. |
| 5,671,411 A | 9/1997 | Watts et al. | 5,818,541 A | 10/1998 | Matsuura et al. |
| 5,675,390 A | 10/1997 | Schindler et al. | 5,819,019 A | 10/1998 | Nelson |
| 5,675,752 A | 10/1997 | Scott et al. | 5,819,156 A | 10/1998 | Belmont |
| 5,677,708 A | 10/1997 | Matthews, III et al. | 5,819,284 A | 10/1998 | Farber et al. |
| 5,682,195 A | 10/1997 | Hendricks et al. | 5,822,123 A | 10/1998 | Davis et al. |
| 5,682,206 A | 10/1997 | Wehmeyer et al. | 5,828,402 A | 10/1998 | Collings |
| 5,687,331 A | 11/1997 | Volk et al. | 5,828,419 A | 10/1998 | Bruette et al. |
| 5,689,648 A | 11/1997 | Diaz et al. | 5,828,420 A | 10/1998 | Marshall et al. |
| 5,689,666 A | 11/1997 | Berquist et al. | 5,828,839 A | 10/1998 | Moncreiff |
| 5,692,214 A | 11/1997 | Levine | 5,828,945 A | 10/1998 | Klosterman |
| 5,694,163 A | 12/1997 | Harrison | 5,830,068 A | 11/1998 | Brenner et al. |
| 5,694,176 A | 12/1997 | Bruette et al. | 5,838,314 A | 11/1998 | Neel et al. |
| 5,694,381 A | 12/1997 | Sako | 5,842,010 A | 11/1998 | Jain et al. |
| 5,696,905 A | 12/1997 | Reimer et al. | 5,842,199 A | 11/1998 | Miller et al. |
| 5,699,107 A | 12/1997 | Lawler et al. | 5,844,620 A | 12/1998 | Coleman et al. |
| 5,699,125 A | 12/1997 | Rzeszewski et al. | 5,848,352 A | 12/1998 | Dougherty et al. |
| 5,708,478 A | 1/1998 | Tognazzini | 5,848,396 A | 12/1998 | Gerace |
| 5,710,601 A | 1/1998 | Marshall et al. | 5,848,397 A | 12/1998 | Marsh et al. |
| 5,710,815 A | 1/1998 | Ming et al. | 5,850,218 A | 12/1998 | LaJoie et al. |
| 5,715,314 A | 2/1998 | Payne et al. | 5,862,292 A | 1/1999 | Kubota et al. |
| 5,715,399 A | 2/1998 | Bezos | 5,867,226 A | 2/1999 | Wehmeyer |
| 5,717,452 A | 2/1998 | Janin et al. | 5,867,227 A | 2/1999 | Yamaguchi |
| 5,721,829 A | 2/1998 | Dunn et al. | 5,872,588 A | 2/1999 | Aras et al. |
| 5,724,521 A | 3/1998 | Dedrick | 5,874,985 A | 2/1999 | Matthews, III |
| 5,724,525 A | 3/1998 | Beyers, II et al. | 5,875,108 A | 2/1999 | Hoffberg et al. |
| 5,727,060 A | 3/1998 | Young | 5,880,768 A | 3/1999 | Lemmons et al. |
| 5,727,163 A | 3/1998 | Bezos | 5,883,677 A | 3/1999 | Hofmann |

| | | | | | | |
|---|---|---|---|---|---|---|
| 5,886,691 | A | 3/1999 | Furuya et al. | 6,125,230 A | 9/2000 | Yaginuma |
| 5,886,731 | A | 3/1999 | Ebisawa | 6,133,909 A | 10/2000 | Schein et al. |
| 5,892,498 | A | 4/1999 | Marshall et al. | 6,141,003 A | 10/2000 | Chor et al. |
| 5,892,535 | A | 4/1999 | Allen et al. | 6,147,714 A | 11/2000 | Terasawa et al. |
| 5,900,905 | A | 5/1999 | Shoff et al. | 6,151,059 A | 11/2000 | Schein et al. |
| 5,903,314 | A | 5/1999 | Niijima et al. | 6,154,203 A | 11/2000 | Yuen et al. |
| 5,903,545 | A | 5/1999 | Sabourin et al. | 6,157,413 A | 12/2000 | Hanafee et al. |
| 5,903,816 | A | 5/1999 | Broadwin et al. | 6,160,545 A | 12/2000 | Eyer et al. |
| 5,905,497 | A | 5/1999 | Vaughan et al. | 6,160,546 A | 12/2000 | Thompson et al. |
| 5,907,323 | A | 5/1999 | Lawler et al. | 6,160,570 A | 12/2000 | Sitnik |
| 5,907,366 | A | 5/1999 | Farmer et al. | 6,163,316 A | 12/2000 | Killian |
| 5,914,746 | A | 6/1999 | Matthews, III et al. | 6,169,542 B1 | 1/2001 | Hooks et al. |
| 5,917,481 | A | 6/1999 | Rzeszewski et al. | 6,172,674 B1 | 1/2001 | Etheredge |
| 5,917,830 | A | 6/1999 | Chen et al. | 6,172,677 B1 | 1/2001 | Stautner et al. |
| 5,918,014 | A | 6/1999 | Robinson | 6,173,271 B1 | 1/2001 | Goodman et al. |
| 5,920,700 | A | 7/1999 | Gordon et al. | 6,177,931 B1 | 1/2001 | Alexander et al. |
| 5,929,849 | A | 7/1999 | Kikinis | 6,178,446 B1 | 1/2001 | Gerszberg et al. |
| 5,929,850 | A | 7/1999 | Broadwin et al. | 6,181,335 B1 | 1/2001 | Hendricks et al. |
| 5,936,679 | A | 8/1999 | Kasahara et al. | 6,186,443 B1 | 2/2001 | Shaffer |
| 5,940,073 | A | 8/1999 | Klosterman et al. | 6,191,780 B1 | 2/2001 | Martin et al. |
| 5,940,572 | A | 8/1999 | Balaban et al. | 6,202,212 B1 | 3/2001 | Sturgeon et al. |
| 5,945,988 | A | 8/1999 | Williams et al. | 6,209,129 B1 | 3/2001 | Carr et al. |
| 5,951,642 | A | 9/1999 | Onoe et al. | 6,209,130 B1 | 3/2001 | Rector, Jr. et al. |
| 5,959,688 | A | 9/1999 | Schein et al. | 6,216,264 B1 | 4/2001 | Maze et al. |
| 5,960,411 | A | 9/1999 | Hartman et al. | 6,239,794 B1 | 5/2001 | Yuen et al. |
| 5,973,683 | A | 10/1999 | Cragun et al. | 6,240,555 B1 | 5/2001 | Shoff et al. |
| 5,974,222 | A | 10/1999 | Yuen et al. | 6,253,203 B1 | 6/2001 | O'Flaherty et al. |
| 5,977,964 | A | 11/1999 | Williams et al. | 6,256,071 B1 | 7/2001 | Hiroi |
| 5,986,650 | A | 11/1999 | Ellis et al. | 6,256,785 B1 | 7/2001 | Klappert et al. |
| 5,988,078 | A | 11/1999 | Levine | 6,257,268 B1 | 7/2001 | Hope et al. |
| 5,990,890 | A | 11/1999 | Etheredge | 6,262,721 B1 | 7/2001 | Tsukidate et al. |
| 5,990,927 | A | 11/1999 | Hendricks et al. | 6,263,501 B1 | 7/2001 | Schein et al. |
| 5,999,912 | A | 12/1999 | Wodarz et al. | 6,263,507 B1 | 7/2001 | Ahmad et al. |
| 6,002,393 | A | 12/1999 | Hite et al. | 6,268,849 B1 | 7/2001 | Boyer et al. |
| 6,002,394 | A | 12/1999 | Schein et al. | 6,269,361 B1 | 7/2001 | Davis et al. |
| 6,005,562 | A | 12/1999 | Shiga et al. | 6,275,268 B1 | 8/2001 | Ellis et al. |
| 6,005,565 | A | 12/1999 | Legall et al. | 6,279,157 B1 | 8/2001 | Takasu |
| 6,005,597 | A | 12/1999 | Barrett et al. | 6,285,713 B1 | 9/2001 | Nakaya et al. |
| 6,006,257 | A | 12/1999 | Slezak | 6,286,140 B1 | 9/2001 | Ivanyi |
| 6,008,802 | A | 12/1999 | Iki et al. | 6,289,346 B1 | 9/2001 | Milewski et al. |
| 6,011,546 | A | 1/2000 | Bertram | 6,298,482 B1 | 10/2001 | Seidman et al. |
| 6,014,137 | A | 1/2000 | Burns | 6,311,877 B1 | 11/2001 | Yang et al. |
| 6,014,502 | A | 1/2000 | Moraes | 6,312,336 B1 | 11/2001 | Handelman et al. |
| 6,016,141 | A | 1/2000 | Knudson et al. | 6,320,588 B1 | 11/2001 | Palmer et al. |
| 6,018,372 | A | 1/2000 | Etheredge | 6,323,911 B1 | 11/2001 | Schein et al. |
| 6,018,768 | A | 1/2000 | Ullman et al. | 6,323,931 B1 | 11/2001 | Fujita et al. |
| 6,020,883 | A | 2/2000 | Herz et al. | 6,331,877 B1 | 12/2001 | Bennington et al. |
| 6,020,929 | A | 2/2000 | Marshall et al. | 6,341,195 B1 | 1/2002 | Mankovitz et al. |
| 6,025,837 | A | 2/2000 | Matthews, III et al. | 6,342,926 B1 | 1/2002 | Hanafee et al. |
| 6,025,886 | A | 2/2000 | Koda | 6,357,042 B2 | 3/2002 | Srinivasan et al. |
| 6,028,599 | A | 2/2000 | Yuen et al. | 6,363,525 B1 | 3/2002 | Dougherty et al. |
| 6,029,045 | A | 2/2000 | Picco et al. | 6,381,582 B1 | 4/2002 | Walker et al. |
| 6,029,195 | A | 2/2000 | Herz | 6,388,714 B1 | 5/2002 | Schein et al. |
| 6,035,304 | A | 3/2000 | Machida et al. | 6,389,593 B1 | 5/2002 | Yamagishi |
| 6,047,317 | A | 4/2000 | Bisdikian et al. | 6,392,710 B1 | 5/2002 | Gonsalves et al. |
| 6,049,824 | A | 4/2000 | Simonin | 6,396,546 B1 | 5/2002 | Alten et al. |
| 6,052,145 | A | 4/2000 | Macrae et al. | 6,400,407 B1 | 6/2002 | Zigmond et al. |
| 6,061,060 | A | 5/2000 | Berry et al. | 6,405,371 B1 | 6/2002 | Oosterhout et al. |
| 6,061,097 | A | 5/2000 | Satterfield | 6,408,437 B1 | 6/2002 | Hendricks et al. |
| 6,064,376 | A | 5/2000 | Berezowski et al. | 6,411,308 B1 | 6/2002 | Blonstein et al. |
| 6,064,980 | A | 5/2000 | Jacobi et al. | 6,412,110 B1 | 6/2002 | Schein et al. |
| 6,067,303 | A | 5/2000 | Aaker et al. | 6,418,556 B1 | 7/2002 | Bennington et al. |
| 6,072,460 | A | 6/2000 | Marshall et al. | 6,421,067 B1 | 7/2002 | Kamen et al. |
| 6,075,526 | A | 6/2000 | Rothmuller | 6,437,836 B1 | 8/2002 | Huang et al. |
| 6,075,551 | A | 6/2000 | Berezowski et al. | 6,446,261 B1 | 9/2002 | Rosser |
| 6,075,575 | A | 6/2000 | Schein et al. | 6,453,471 B1 | 9/2002 | Klosterman |
| 6,078,348 | A | 6/2000 | Klosterman et al. | 6,456,331 B2 | 9/2002 | Kwoh |
| 6,081,750 | A | 6/2000 | Hoffberg et al. | 6,463,585 B1 | 10/2002 | Hendricks et al. |
| 6,088,722 | A | 7/2000 | Herz et al. | 6,469,753 B1 | 10/2002 | Klosterman et al. |
| 6,091,883 | A | 7/2000 | Artigalas et al. | 6,470,497 B1 | 10/2002 | Ellis et al. |
| 6,098,065 | A | 8/2000 | Skillen et al. | 6,477,579 B1 | 11/2002 | Kunkel et al. |
| 6,108,042 | A | 8/2000 | Adams et al. | 6,477,705 B1 | 11/2002 | Yuen et al. |
| 6,111,614 | A | 8/2000 | Mugura et al. | 6,486,920 B2 | 11/2002 | Arai et al. |
| 6,112,186 | A | 8/2000 | Bergh et al. | 6,493,876 B1 | 12/2002 | DeFreese et al. |
| 6,115,057 | A | 9/2000 | Kwoh et al. | 6,498,895 B2 | 12/2002 | Young et al. |
| 6,118,492 | A | 9/2000 | Milnes et al. | 6,505,348 B1 | 1/2003 | Knowles et al. |
| 6,119,098 | A | 9/2000 | Guyot et al. | 6,515,680 B1 | 2/2003 | Hendricks et al. |
| 6,119,101 | A | 9/2000 | Peckover | 6,539,548 B1 | 3/2003 | Hendricks et al. |
| 6,122,011 | A | 9/2000 | Dias et al. | 6,546,556 B1 | 4/2003 | Kataoka et al. |

| | | |
|---|---|---|
| 6,564,378 B1 | 5/2003 | Satterfield et al. |
| 6,564,379 B1 | 5/2003 | Knudson et al. |
| 6,574,424 B1 | 6/2003 | Dimitri et al. |
| 6,588,013 B1 | 7/2003 | Lumley et al. |
| 6,600,364 B1 | 7/2003 | Liang et al. |
| 6,600,503 B2 | 7/2003 | Stautner et al. |
| 6,604,138 B1 | 8/2003 | Virine et al. |
| 6,606,128 B2 | 8/2003 | Hanafee et al. |
| 6,622,306 B1 | 9/2003 | Kamada |
| 6,631,523 B1 | 10/2003 | Matthews, III et al. |
| 6,651,251 B1 | 11/2003 | Shoff et al. |
| 6,660,503 B2 | 12/2003 | Kierulff |
| 6,661,468 B2 | 12/2003 | Alten et al. |
| 6,665,869 B1 | 12/2003 | Ellis et al. |
| 6,687,906 B1 | 2/2004 | Yuen et al. |
| 6,698,020 B1 | 2/2004 | Zigmond et al. |
| 6,732,369 B1 | 5/2004 | Schein et al. |
| 6,738,978 B1 | 5/2004 | Hendricks et al. |
| 6,742,183 B1 | 5/2004 | Reynolds et al. |
| 6,751,800 B1 | 6/2004 | Fukuda et al. |
| 6,756,997 B1 | 6/2004 | Ward, III et al. |
| 6,757,906 B1 | 6/2004 | Look et al. |
| 6,799,326 B2 | 9/2004 | Boylan, III et al. |
| 6,799,327 B1 | 9/2004 | Reynolds et al. |
| 6,828,993 B1 | 12/2004 | Hendricks et al. |
| 6,857,131 B1 | 2/2005 | Yagawa et al. |
| 6,868,551 B1 | 3/2005 | Lawler et al. |
| 6,938,208 B2 | 8/2005 | Reichardt |
| 6,973,669 B2 | 12/2005 | Daniels |
| 6,983,478 B1 | 1/2006 | Grauch et al. |
| 7,003,792 B1 | 2/2006 | Yuen |
| 7,028,326 B1 | 4/2006 | Westlake et al. |
| 7,039,935 B2 | 5/2006 | Knudson et al. |
| 7,069,576 B1 | 6/2006 | Knudson et al. |
| 7,185,355 B1 | 2/2007 | Ellis et al. |
| 7,187,847 B2 | 3/2007 | Young et al. |
| 7,266,833 B2 | 9/2007 | Ward, III et al. |
| 7,287,267 B2 | 10/2007 | Knudson et al. |
| 7,293,276 B2 | 11/2007 | Phillips et al. |
| 7,328,450 B2 | 2/2008 | Macrae et al. |
| 7,392,532 B2 | 6/2008 | White et al. |
| 7,480,929 B2 | 1/2009 | Klosterman et al. |
| 7,487,529 B1 | 2/2009 | Orlick |
| 7,493,641 B2 | 2/2009 | Klosterman et al. |
| 7,503,055 B2 | 3/2009 | Reynolds et al. |
| 7,634,786 B2 | 12/2009 | Knee et al. |
| 7,665,109 B2 | 2/2010 | Matthews, III et al. |
| 7,668,832 B2 | 2/2010 | Yeh et al. |
| 2001/0001160 A1 | 5/2001 | Shoff et al. |
| 2001/0029610 A1 | 10/2001 | Corvin et al. |
| 2001/0042246 A1 | 11/2001 | Yuen et al. |
| 2001/0047298 A1 | 11/2001 | Moore et al. |
| 2001/0049820 A1 | 12/2001 | Barton |
| 2001/0054181 A1 | 12/2001 | Corvin |
| 2002/0032363 A1 | 3/2002 | Kroll et al. |
| 2002/0042913 A1 | 4/2002 | Ellis et al. |
| 2002/0042914 A1 | 4/2002 | Walker et al. |
| 2002/0042918 A1 | 4/2002 | Townsend et al. |
| 2002/0049973 A1 | 4/2002 | Alten et al. |
| 2002/0059602 A1 | 5/2002 | Macrae et al. |
| 2002/0073424 A1 | 6/2002 | Ward, III et al. |
| 2002/0083439 A1 | 6/2002 | Eldering |
| 2002/0092017 A1 | 7/2002 | Klosterman et al. |
| 2002/0120933 A1 | 8/2002 | Knudson et al. |
| 2002/0124249 A1 | 9/2002 | Shintani et al. |
| 2003/0005432 A1 | 1/2003 | Ellis et al. |
| 2003/0005445 A1 | 1/2003 | Schein et al. |
| 2003/0110499 A1 | 6/2003 | Knudson et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0196203 A1 | 10/2003 | Ellis et al. |
| 2003/0204847 A1 | 10/2003 | Ellis et al. |
| 2003/0208756 A1 | 11/2003 | Macrae et al. |
| 2003/0208758 A1 | 11/2003 | Schein et al. |
| 2004/0003407 A1 | 1/2004 | Hanafee et al. |
| 2004/0049787 A1 | 3/2004 | Maissel et al. |
| 2004/0078809 A1 | 4/2004 | Drazin |
| 2004/0103024 A1 | 5/2004 | Patel et al. |
| 2004/0103439 A1 | 5/2004 | Macrae et al. |
| 2004/0111742 A1 | 6/2004 | Hendricks et al. |
| 2004/0139465 A1 | 7/2004 | Matthews, III et al. |
| 2004/0168189 A1 | 8/2004 | Reynolds et al. |
| 2004/0194131 A1 | 9/2004 | Ellis et al. |
| 2004/0194138 A1 | 9/2004 | Boylan, III et al. |
| 2005/0010949 A1 | 1/2005 | Ward et al. |
| 2005/0015804 A1 | 1/2005 | LaJoie et al. |
| 2005/0050027 A1 | 3/2005 | Yeh et al. |
| 2005/0097622 A1 | 5/2005 | Zigmond et al. |
| 2005/0155056 A1 | 7/2005 | Knee et al. |
| 2005/0157217 A1 | 7/2005 | Hendricks |
| 2005/0198668 A1 | 9/2005 | Yuen et al. |
| 2005/0204382 A1 | 9/2005 | Ellis |
| 2005/0216936 A1 | 9/2005 | Knudson et al. |
| 2005/0229214 A1 | 10/2005 | Young et al. |
| 2005/0244138 A1 | 11/2005 | O'Connor et al. |
| 2005/0283796 A1 | 12/2005 | Flickinger |
| 2006/0156336 A1 | 7/2006 | Knudson et al. |
| 2006/0184960 A1 | 8/2006 | Horton et al. |
| 2006/0248555 A1 | 11/2006 | Eldering |
| 2007/0016926 A1 | 1/2007 | Ward et al. |
| 2007/0033613 A1 | 2/2007 | Ward et al. |
| 2007/0162934 A1 | 7/2007 | Roop et al. |
| 2007/0186240 A1 | 8/2007 | Ward et al. |
| 2008/0127265 A1 | 5/2008 | Ward et al. |
| 2008/0127266 A1 | 5/2008 | Ward et al. |
| 2008/0178221 A1 | 7/2008 | Schein et al. |
| 2008/0184286 A1 | 7/2008 | Kwoh et al. |
| 2008/0184315 A1 | 7/2008 | Ellis et al. |
| 2008/0189744 A1 | 8/2008 | Schein et al. |
| 2008/0235725 A1 | 9/2008 | Hendricks |
| 2010/0175078 A1 | 7/2010 | Knudson et al. |
| 2010/0319013 A1 | 12/2010 | Knudson et al. |

FOREIGN PATENT DOCUMENTS

| | | |
|---|---|---|
| AU | 731010 | 7/1998 |
| AU | 733993 | 2/1999 |
| AU | 760568 | 5/2003 |
| CA | 1030505 | 5/1978 |
| CA | 1187197 | 5/1985 |
| CA | 1188811 | 6/1985 |
| CA | 1196082 | 10/1985 |
| CA | 1200911 | 2/1986 |
| CA | 2151458 | 6/1994 |
| CA | 2164608 | 12/1994 |
| CA | 2297039 | 1/1999 |
| CA | 2312326 | 6/1999 |
| CA | 2 324 278 | 11/1999 |
| CA | 2513282 | 11/1999 |
| CN | 1555191 | 12/2004 |
| DE | 2918846 | 11/1980 |
| DE | 3246225 | 6/1984 |
| DE | 3337204 | 4/1985 |
| DE | 3621263 | 1/1988 |
| DE | 3909334 | 9/1990 |
| DE | 42 01 031 | 7/1993 |
| DE | 19531121 | 2/1997 |
| DE | 19740079 | 3/1999 |
| DE | 19931046 | 1/2001 |
| EP | 0 239 884 | 10/1987 |
| EP | 0 396 062 | 11/1990 |
| EP | 0 401 930 | 12/1990 |
| EP | 0 408 892 | 1/1991 |
| EP | 0 420 123 | 4/1991 |
| EP | 0 424 648 | 5/1991 |
| EP | 0 444 496 | 9/1991 |
| EP | 0 447 968 | 9/1991 |
| EP | 0 488 379 | 6/1992 |
| EP | 0 497 235 | 8/1992 |
| EP | 0 532 322 | 3/1993 |
| EP | 0 550 911 | 7/1993 |
| EP | 0 560 593 | 9/1993 |
| EP | 0 572 090 | 12/1993 |
| EP | 0 339 675 | 2/1994 |
| EP | 0682452 | 11/1995 |
| EP | 0 721 253 | 7/1996 |

| | | | | | | |
|---|---|---|---|---|---|---|
| EP | 0 725 539 | 8/1996 | | JP | 2002-279969 | 9/2002 |
| EP | 0 749 081 | 12/1996 | | JP | 2003-264750 | 9/2003 |
| EP | 0 752 767 | 1/1997 | | JP | 2006-246521 | 9/2006 |
| EP | 0 753 964 | 1/1997 | | JP | 4062577 | 3/2008 |
| EP | 0 762 751 | 3/1997 | | MX | 256315 | 3/1999 |
| EP | 0 772 360 | 5/1997 | | NZ | 506652 | 5/2003 |
| EP | 0 774 866 A2 | 5/1997 | | WO | WO 86/01962 | 3/1986 |
| EP | 0 775 417 | 5/1997 | | WO | WO 87/03766 | 6/1987 |
| EP | 0 784 405 | 7/1997 | | WO | WO 88/04057 | 6/1988 |
| EP | 0 805 594 | 11/1997 | | WO | WO 88/04507 | 6/1988 |
| EP | 0 822 718 | 2/1998 | | WO | WO 89/02682 | 3/1989 |
| EP | 0 827 340 | 3/1998 | | WO | WO 89/03085 | 4/1989 |
| EP | 0 834 798 | 4/1998 | | WO | WO 89/12370 | 12/1989 |
| EP | 0 848 554 | 6/1998 | | WO | WO 90/01243 | 2/1990 |
| EP | 0 849 948 | 6/1998 | | WO | WO 90/15507 | 12/1990 |
| EP | 0 851 681 | 7/1998 | | WO | WO 91/00670 | 1/1991 |
| EP | 0 852 442 | 7/1998 | | WO | WO 91/18476 | 11/1991 |
| EP | 0 854 645 A2 | 7/1998 | | WO | WO 92/04801 | 3/1992 |
| EP | 0 854 654 | 7/1998 | | WO | WO 93/04473 | 3/1993 |
| EP | 0 880 856 | 12/1998 | | WO | WO 93/05452 | 3/1993 |
| EP | 0 905 985 | 3/1999 | | WO | WO 93/11638 | 6/1993 |
| EP | 0 924 927 | 6/1999 | | WO | WO 93/11639 | 6/1993 |
| EP | 0 935 393 | 8/1999 | | WO | WO 93/11640 | 6/1993 |
| EP | 0 944 253 | 9/1999 | | WO | WO 93/23957 | 11/1993 |
| EP | 0 963 119 | 12/1999 | | WO | WO 94/13107 | 6/1994 |
| EP | 0 988 876 | 3/2000 | | WO | WO 94/14281 | 6/1994 |
| EP | 1 095 504 | 5/2001 | | WO | WO 94/14282 | 6/1994 |
| EP | 1 036 466 | 3/2003 | | WO | WO 94/14283 | 6/1994 |
| FR | 2662895 | 12/1991 | | WO | WO 94/14284 | 6/1994 |
| GB | 1 554 411 | 10/1979 | | WO | WO 94/21085 | 9/1994 |
| GB | 2034995 | 6/1980 | | WO | WO 94/23383 | 10/1994 |
| GB | 2126002 | 3/1984 | | WO | WO 94/29811 | 12/1994 |
| GB | 2185670 | 7/1987 | | WO | WO 95/01056 | 1/1995 |
| GB | 2 217 144 | 10/1989 | | WO | WO 95/01058 | 1/1995 |
| GB | 2256546 | 12/1992 | | WO | WO 95/01059 | 1/1995 |
| GB | 2 305 049 | 3/1997 | | WO | WO 95/06389 | 3/1995 |
| GB | 2309134 | 7/1997 | | WO | WO 95/07003 | 3/1995 |
| HK | 1035285 | 3/2005 | | WO | WO 95/10910 | 4/1995 |
| JP | 58-137334 | 8/1983 | | WO | WO 95/15649 | 6/1995 |
| JP | 58-196738 | 11/1983 | | WO | WO 95/15657 | 6/1995 |
| JP | 58-210776 | 12/1983 | | WO | WO 95/15658 | 6/1995 |
| JP | 59-141878 | 8/1984 | | WO | WO 95/16568 | 6/1995 |
| JP | 60-61935 | 4/1985 | | WO | WO 95/19092 | 7/1995 |
| JP | 61-050470 | 3/1986 | | WO | WO 95/26608 | 10/1995 |
| JP | 61-074476 | 4/1986 | | WO | WO 95/28055 | 10/1995 |
| JP | 62-060370 | 3/1987 | | WO | WO 95/28799 | 10/1995 |
| JP | 62-060384 | 3/1987 | | WO | WO 95/30961 | 11/1995 |
| JP | 63-234679 | 9/1988 | | WO | WO 95/31069 | 11/1995 |
| JP | 1-307944 | 12/1989 | | WO | WO 95/32583 | 11/1995 |
| JP | 2-048879 | 2/1990 | | WO | WO 95/32585 | 11/1995 |
| JP | 03063990 | 3/1991 | | WO | WO 96/07270 | 3/1996 |
| JP | 04-227380 | 8/1992 | | WO | WO 96/08109 | 3/1996 |
| JP | 05-183826 | 7/1993 | | WO | WO 96/08113 | 3/1996 |
| JP | 05-284437 | 10/1993 | | WO | WO 96/09721 | 3/1996 |
| JP | 06-021907 | 1/1994 | | WO | WO 96/13932 | 5/1996 |
| JP | 07-020254 | 1/1995 | | WO | WO 96/13935 | 5/1996 |
| JP | 07-050259 | 2/1995 | | WO | WO 96/17467 | 6/1996 |
| JP | 07-076592 | 3/1995 | | WO | WO 96/17473 | 6/1996 |
| JP | 07-123326 | 5/1995 | | WO | WO 96/21990 | 7/1996 |
| JP | 07-147657 | 6/1995 | | WO | WO 96/26605 | 8/1996 |
| JP | 07-288759 | 10/1995 | | WO | WO 96/27270 | 9/1996 |
| JP | 07-321748 | 12/1995 | | WO | WO 96/27982 | 9/1996 |
| JP | 08-32528 | 2/1996 | | WO | WO 96/31980 | 10/1996 |
| JP | 08-32538 | 2/1996 | | WO | WO 96/34467 | 10/1996 |
| JP | 08-125497 | 5/1996 | | WO | WO 96/34486 | 10/1996 |
| JP | 08-251122 | 9/1996 | | WO | WO 96/34491 | 10/1996 |
| JP | 08-275077 | 10/1996 | | WO | WO 96/38799 | 12/1996 |
| JP | 09-037151 | 2/1997 | | WO | WO 96/41471 | 12/1996 |
| JP | 9-37168 | 2/1997 | | WO | WO 96/41477 | 12/1996 |
| JP | 09-037172 | 2/1997 | | WO | WO 96/41478 | 12/1996 |
| JP | 09-102827 | 4/1997 | | WO | WO 97/02702 | 1/1997 |
| JP | 10-501936 | 2/1998 | | WO | WO 97/04595 | 2/1997 |
| JP | 10-143340 | 5/1998 | | WO | WO 97/07656 | 3/1997 |
| JP | 10-143349 | 5/1998 | | WO | WO 97/12486 | 4/1997 |
| JP | 10-512420 | 11/1998 | | WO | WO 97/13368 | 4/1997 |
| JP | 2838892 | 12/1998 | | WO | WO 97/17774 | 5/1997 |
| JP | 2001-213595 | 8/2001 | | WO | WO 97/18675 | 5/1997 |
| JP | 2001-1513595 | 9/2001 | | WO | WO 97/26612 | 7/1997 |
| JP | 2002-513255 | 5/2002 | | WO | WO 97/31480 | 8/1997 |

| | | |
|---|---|---|
| WO | WO 97/41673 | 11/1997 |
| WO | WO 97/42763 | 11/1997 |
| WO | WO 97/48230 | 12/1997 |
| WO | WO 97/49237 | 12/1997 |
| WO | WO 97/49241 | 12/1997 |
| WO | WO 97/49242 | 12/1997 |
| WO | WO 98/06219 | 2/1998 |
| WO | WO 98/10589 | 3/1998 |
| WO | WO 98/16062 | 4/1998 |
| WO | WO 98/17064 | 4/1998 |
| WO | WO 98/20675 | 5/1998 |
| WO | WO 98/26569 | 6/1998 |
| WO | WO 98/26584 | 6/1998 |
| WO | WO 98/27723 | 6/1998 |
| WO | WO 98/28906 | 7/1998 |
| WO | WO 98/31148 | 7/1998 |
| WO | WO 98/37695 | 8/1998 |
| WO | WO 98/41020 | 9/1998 |
| WO | WO 98/43183 | 10/1998 |
| WO | WO 98/47279 | 10/1998 |
| WO | WO 98/48566 | 10/1998 |
| WO | WO 98/56172 | 12/1998 |
| WO | WO 98/56712 | 12/1998 |
| WO | WO 99/01984 | 1/1999 |
| WO | WO 99/04561 | 1/1999 |
| WO | WO 99/07142 | 2/1999 |
| WO | WO 99/14947 | 3/1999 |
| WO | WO 99/18722 | 4/1999 |
| WO | WO 99/29109 | 6/1999 |
| WO | WO 99/30491 | 6/1999 |
| WO | WO 99/31480 | 6/1999 |
| WO | WO 99/45700 | 9/1999 |
| WO | WO 99/45701 | 9/1999 |
| WO | WO 99/45702 | 9/1999 |
| WO | WO 99/52285 | 10/1999 |
| WO | WO 99/56466 | 11/1999 |
| WO | WO 99/56473 | 11/1999 |
| WO | WO 99/60783 | 11/1999 |
| WO | WO 99/60789 | 11/1999 |
| WO | WO 00/04706 | 1/2000 |
| WO | WO 00/04708 | 1/2000 |
| WO | WO 00/05889 | 2/2000 |
| WO | WO 00/11865 | 3/2000 |
| WO | WO 00/13415 | 3/2000 |
| WO | WO 00/16548 | 3/2000 |
| WO | WO 00/27122 | 5/2000 |
| WO | WO 00/28734 | 5/2000 |
| WO | WO 00/33160 | 6/2000 |
| WO | WO 00/33224 | 6/2000 |
| WO | WO 00/33560 | 6/2000 |
| WO | WO 00/33573 | 6/2000 |
| WO | WO 00/49801 | 8/2000 |
| WO | WO 00/79798 | 12/2000 |
| WO | WO 01/01677 | 1/2001 |
| WO | WO 01/06784 | 1/2001 |
| WO | WO 01/15438 | 3/2001 |
| WO | WO 01/35662 | 5/2001 |
| WO | WO 01/89213 | 11/2001 |
| WO | WO 02/03227 | 1/2002 |
| WO | WO 02/31731 | 4/2002 |
| WO | WO 02/084992 | 10/2002 |

OTHER PUBLICATIONS

U.S. Appl. No. 09/332,244, filed Jun. 11, 1999, Ellis et al.

U.S. Appl. No. 09/356,268, filed Jul. 16, 1999, Rudnick et al.

"272OR Satellite Receiver User's Guide," General Instrument, 1991, pp. 58-61.

"Addressable Converters: A New Development at CableData," Via Cable, vol. 1, No. 12, Dec. 1981.

"Bell Atlantic Buys Cable TV Company for $22bn," Financial Times (London), Oct. 14, 1993 p. 65.

"Cable Television Equipment," Jerrold Communications Publication, dated 1992 and 1993, pp. 8-2.1 to 8-6 and 8-14.1 to 8-14.3.

"Computer Network: Current Status and Outlook on Leading Science and Technology," Bureau of Science & Technology (Japan), vol. 1, Dec. 1986.

Creation/Modification of the Audio Signal Processor Setup for a PC Audio Editor, IBM Technical Disclosure Bulletin, vol. 30, No. 10, Mar. 1988, pp. 367-376.

"D2B-Home Bus Fur Audio and Video," Selektor, Apr. 1990, pp. 10, 12.

"Dial M for Movie", Funkschau 11/94 Perspektiven, Video on Demand, pp. 78-79. (English language translation attached).

"Digital Video Broadcasting (DVB); DVB specification for data broadcasting," European Telecommunication Standards Institute, Draft EN 301 192 V1.2.1 (Jan. 1999).

"'Duck Tales,'(1987)[TV Series 1987-1990]," Internet Movie Database (IMDB) [Retrieved on Apr. 7, 2007].

"Electronic Programme Guide (EPG); Protocol for a TV Guide using electronic data transmission," by European Telecommunication Standards Institute, May 1997, Valbonne, France, publication No. ETS 300 707.

"Enhanced Content Specification," "ATVEF," from the internet at http://www.atvef.com/library/spec.html, printed Aug. 22, 2001, the document bears a Copyright date of 1998, 1999, 2000.

"European Telecommunications Standards: Digital Broadcasting Systems for Television Sound and Data Services; Specification for Service Information (SI) in Digital Video Broadcasting (DVB) Systems," European Telecommunications Standards Institute, Dec. 1994.

"Facsimile Transmission," NHK Research Monthly Report, Dec. 1987(Unknown author).

"Getting Started" Installation Guide, "Using StarSight 1" Manual, and Remote Control "Quick Reference Guide."

"Interactive Computer Conference Server," IBM Technical Bulletin, vol. 34, No. 7A, Dec. 1991, pp. 375-377.

"Interface Device for Conventional TVs to Improve Functionality," IBM Technical Disclosure Bulletin, vol. 36, No. 7, Jul. 1993, pp. 53-54.

James Sorce, David Fay, Brian Raila and Robert Virzi, "Designing a Broadband Residential Entertainment Service: A Case Study," GTE Laboratories Incorporated, undated, pp. 141-148.

"Lists> What's on Tonite! TV Listings (fwd)," Internet article (on line), Jan. 28, 1995, XP 002378869 [Retrieved on Apr. 28, 2006].

"MSI Datacasting Systems," TV Communications Journal, Jan. 1973.

"Open TV fur interaktives Fernsehen," Trend and Technik, 9-95 RFE, p. 100. (English language translation attached).

"Open TV Launches OpenStreamer™ Technology for Broadcasters to Deliver First Ever Real-Time Digital Interactive Television," from the internet at http://www.opentv.com/news/openstreamer_press_final.htm, printed on Jun. 28, 1999, the document bears a copyright date of 1999.

"Prevue Networks and OpenTV(R) Agree to Work Together on Deploying Interactive Program Guides Worldwide," from the internet at http://www.opentv.com/news/prevuefinal.htm, printed on Jun. 28, 1999.

"Probe XL Brochure, Auto Tote Systems Inc.," (Newark, Delaware) (undated) 57 pgs.

"Rewind, reply and unwind with new high-tech TV devices," by Lawrence J. Magid, LA Times. This document was printed from the internet on Jun. 6, 1999 and bears a date of May 19, 1999.

"Technological Examination & Basic Investigative Research Report on Image Databases," Japan Mechanical Engineering Organization Int'l Society for the Advancement of Image Software, Japan, Mar. 1988.

"Technology: Turn on, tune in and print out—an experimental interactive television service is set to alter our viewing habits," Financial Times (London), Oct. 14, 1993, p. 11.

"The New Media and Broadcast Policy: An Investigation & Research Conference Report on Broadcasting Diversification," Radio Regulatory Bureau, Japan Ministry of Posts & Telecommunications, Mar. 1982.

"TV Listings Functional Spec.," Time Video Information Services, Inc., undated.

"Using StarSight 2," Instruction Manual, StarSight Telecast, Inc., StarSight CB 1500 Customer Letter, 1994.

"Windows 98 Feature Combines TV, Terminal and the Internet," New York Times, Aug. 18, 1998.

"Prodigy Launches Interactive TV Listing", Apr. 22, 1994 public Broadcasting Report.

"StarSight Interactive Television Program Guide III" Jim Leftwich and Steve Schein, Functional/ Interactional Architecture Specification Document, Orbit Interaction, Palo alto, California, Published before Apr. 19, 1995.

"StarSight Interactive Television Program Guide IV" Jim Leftwich and Steve Schein, Functional/ Interactional Architecture Specification Document, Orbit Interaction, Palo Alto, California, Published before Apr. 19, 1995.

"StarSight Interactive Television Program Guide" Jim Leftwich, Willy Lai & Steve Schein Published before Apr.19, 1995.

"TV Guide Online Set for Fall", Entertainment Marketing Letter, Aug. 1994.

Advertisement for "TV Decisions," Cable Vision, Aug. 4, 1986.

Alexander, Michael "Visualizing cleared-off desktops," Computerworld, May 6, 1991, p. 20.

Antonoff, M., "Stay Tuned for Smart TV," Popular Science, Nov. 1990, pp. 62-65.

Bach, U. et al., "Multimedia TV Set, Part 1" Radio-Fernsehen Elektronik (RFE), Sep. 1996, pp. 28, 30, 31. (English language translation attached.).

Bach, U. et al., "Multimedia TV Set, Part 2 and Conclusion," Radio-Fernsehen Elektronik (RFE), Oct. 1996, pp. 38-40. (English language translation attached.).

Baer, R.H, "Innovative Add-On TV Products," IEEE Transactions on Consumer Electronics, vol. CE-25, Nov. 1979, pp. 765-771.

Bensch, U., "VPV Videotext Programs Videorecorder," IEEE Paper, Jun. 1988, pp. 788-792.

Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.

Brochure, "A New Approach to Addressability," CableData, undated.

Brochure, "Westar and Videotoken Network Present the CableComputer," Revised Aug. 15, 1985 (Plaintiff's 334).

Brochure, Time Inc., "Now, Through the Advances of the Computer Age, You Can Get the Information You Want, When You Want It. Instantly and Conveniently, On Your Home TV Screen," Time Teletext, Time Video Information Services, Inc., undated (V 79167-79175).

Brochure, VTN "Videotoken Network, New Dimension Television," Dec. 1985 (Plaintiff's Exhibit 313).

Brugliera, Vito., "Digital On-Screen Display—A New Technology for the Consumer Interface," Symposium Record Cable TV Sessions of the 18th International Television Symposium & Technical Exhibition—Montreux, Switzerland, Jun. 10-15, 1993, pp. 571-586.

Cable Computer User's Guide, Rev. 1, Dec. 1985 (Plaintiff's Exhibit 289).

CableData, Roseville Consumer Presentation, Mar. 1985.

Carne, E.B., "The Wired Household," IEEE Spectrum, vol. 16 No. 10, Oct. 1979, pp. 61-66.

Chan, Patrick P., "Learning Considerations in User Interface Design: The Room Model," Publication of the Software Portability Laboratory, University of Waterloo, Ontario, Canada, Jul. 1984.

Christodoulakis, Steven and Graham, Stephen "Browsing Within Time-Driven Multimedia Documents," publication of the Institute for Computer Research, University of Waterloo, Waterloo, Ontario, Canada Jul. 1988 pp. 219-227.

Cox, J. et al, "Extended Services in a Digital Compression System," Proceedings from Eleven Technical Sessions: 42nd Annual Convention and Exposition of the National Cable Television Association, Jun. 1993, pp. 185-191.

Damouny, N.G., "Teletext Decoders—Keeping Up With the Latest Advances," IEEE Transactions on Consumer Electronics, vol. CE-30, No. 3, Aug. 1984, pp. 429-435.

Declaration Under 37 C.F.R. § 1.132 of Richard E. Glassberg, signed Oct. 20, 2006, filed Oct. 24, 2006, from U.S. Appl. No. 10/346,266.

DiRosa, S. "BIGSURF Netguide", Jul. 1995, vol. 3.1 (Sections 18,21, and 28—renumbered as pp. 1-27).

Edwardson, S.M., & Gee, A., "CEEFAX: A Proposed New Broadcasting Service," Journal of the SMPTE, Jan. 1974, Vol. 83 No. 1, pp. 14-19.

Eitz, Gerhard, "Zukünftige Informations-und Datenangebote beim digitalen Femsehen—EPG Und 'Lesezeichen'," RTM Rundfunktechnische Mitteilungen, Jun. 1997, vol. 41, pp. 67-72.

European Search Report dated Nov. 19, 2002 from European Application No. 989446111.7.

European Telecommunication Standard, "Electronic Programme Guide (EPG); Protocol for a TV Guide using electronic data transmission," pp. 1-45, sections 1-11.12.7 and annex A-P, bearing a date of May 1997.

Hartwig, Rautenberg, Bollmann, "Broadcasting and Processing of Program Guides for Digital TV," SMPTE Journal, pp. 727-732, Oct. 1997.

Hedger, J., "Telesoftware: Home Computing Via Broadcast Teletext," IEEE Transactions on Consumer Electronics, vol. CE-25, No. 3, Jul. 1979, pp. 279-287.

Hiroshi Ishii et al, "Clearface: Translucent Multiuser Interface for TeamWorkStation," ECSCW, Sep. 1991, pp. 6-10.

Hiroshi Ishii et al, "Toward an Open Shared Workspace: Computer and Video Fusion Approach of Team Workstation," Communications of the ACM, Dec. 1991, vol. 34 No. 12, pp. 37-50.

Hirotada Ueda et al, "Impact: An Interactive Natural-Motion-Picture Dedicated Multi-Media Authoring System," Communications of the ACM, Mar. 1991, pp. 343-350.

Hofmann, Neumann, Oberlies & Schadwinkel, "Videotext Programmiert Videorecorder," Rundfunktechnischen Mitteilungen, (Broadcast Engineering Reports), vol. 26 No. 6, pp. 254-257, Nov.-Dec. 1982.

Installation Guide, "Getting Started 1" Manual, and Remote Control "Quick Reference Guide."

Instruction Manual, "Using StarSight 2," StarSight Telecast, Inc., StarSight CB 1500 Customer Letter, 1994.

Instructional Manual, "Sonic the Hedgehog," Sega of America, 1992.

James, A., "Oracle—Broadcasting the Written Word," Wireless World, Jul. 1973, vol. 79 No. 1453, pp. 314-316.

Judice, C.N., "Move Over Cable, Here Comes Video Via Voice Lines," Network World, Sep. 1986, p. 26.

Kai et al "Development of a Simulation System for Integrated Services Television," Report from Information Processing Society of Japan, Japan, Sep. 13, 1996, vol. 96, No. 90 pgs.

Karstad, K., "Microprocessor Control for Color-TV Receivers," IEEE Transactions on Consumer Electronics, vol. CE-26, May 1980, pp. 149-155.

Kornhaas, W., "Von der Textprogrammierung uber TOP zum Archivsystem," Radio Fernsehen Elektronik, vol. 40, No. 8, Aug. 30, 1991, pp. 465-468, XP 000240875 Veb Verlag Technik. Berlin, DE ISSN: 1436-1574.

Listing of computer code for operating system within the Cable Computer in 1985 (Plaintiff's Exhibit 298).

Listing of computer code for Video HTU Program (Plaintiff's Exhibit 299).

Lowenstein, R.L. and Aller, H.E, "The Inevitable March of Videotex," Technology Review, vol. 88, Oct. 1985, p. 22.

M/A-COM, Inc., "Videocipher II Satellite Descrambler Owner's Manual," dated Prior Feb. 1986, pp. 1-17.

Mack Daily, "Addressable Decoder with Downloadable Operation," Proceedings from the Eleven Technical Sessions, 42nd Annual Convention and Exposition of the NCTA, Jun. 6-9, 1993, pp. 82-89.

Mannes, G., "Smart Screens: Development of Personal Navigation Systems for TV Viewers," Video Magazine, Dec. 1993.

Mar. 19, 1985 letter from G. Knapp of CableData to R. Hansen of Weststar Communications, Inc. (Plaintiffs Exhibit 325).

Markowitz, A. "Companies Jump on Interactive Bandwagon," Discount Store News, Dec. 6, 1993, pp. 4 and 131.

McKenzie, G.A., "Oracle—An Information Broadcasting Service Using Data Transmission in the Vertical Interval," Journal of the SMPTE, Jan. 1974, vol. 83 No. 1, pp. 6-10.

Merrell, R.G., "Tac Timer," 1986 NCTA Technical Papers, pp. 203-206.

Neumann, Andreas, "WDR Online Aufbau and Perspektiven Automatisierter Online-Dienste im WDR," RTM Rundfunktechnische Mitteilungen, vol. 41, pp. 56-66, Jun. 1997.

No subject, "Tom Schauer (tschauer@moscow.com)Thu, Sep. 28, 1995 16:46:48-700," XP-002378870 [Retrieved from the Internet Apr. 28, 2006].

Office Actions and Replies from U.S. Appl. No. 10/453,388.

Pfister, Larry T., "Teletext: Its Time Has Come," Prepared for the IGC Videotext / Teletext Conference, Andover, Massachusetts, Dec. 14, 1982, pp. 1-11.

Prevue Guide Brochure, Spring 1984.

Prevue Guide Brochure, Spring 1994.

Rayers, D.J., "Telesoftware by Teletext," 1984 IEEE Conference Papers, vol. 240, p. 323.

Rogers, "Telcos vs. Cable TV : The Global View With Markets Converging and Regulatory Barriers Falling, Service Carriers Are Ready to Rumble," Data Communications, Sep. 21, 1995, vol. 24, No. 13, pp. 75-76, 78, 80, XP000526196.

Roizen, Joseph "Teletext in the USA," Society of Motion Picture and Television Engineers Journal, Jul. 1981, pp. 602-610.

Roseville City Council Presentation, Mar. 13, 1985 (Defendant's Exhibit 226).

Ross Peddicord, "New on TV: You Bet Your Horse," The Sun, Baltimore Maryland Dec. 15, 1994, 1 pg.

Schlender, B.R., "Couch Potatoes! Now Its Smart TV," Fortune, Nov. 20, 1989, pp. 111-116.

Schmuckler, Eric "A marriage that's made in cyberspace (television networks pursue links with online information services)," May 16, 1994 Mediaweek, v. 4, No. 20, p. 22(3).

Sealfon, Peggy, "High Tech TV," Photographic, Dec. 1984.

Sunada, K. et al, "Teletext Color Television Receiver Model C-29M950, C26M940," NEC Home Electronics , NEC Giho, 1987.

Supplementary European Search Report for Application No. EP 98 93 5889, completed on Sep. 28, 2001.

Sussman, A. "GTE Tunes in to Home TV Shopping," PC Week, Jun. 28, 1988, p. C15.

Tech Notes: Product Updates from M/A-COM Cable Home Group, "Videocipher Owner's Manual Update," Issue No. 6, Feb. 1986.

Technical White Paper, "Open TV™ Operating Environment," ( © 1998 OpenTV Inc.), pp. 1-12.

Transcript of the Deposition of John Roop, Oct. 1996, pp. 186-187.

Trial testimony of Michael Axford, *Prevue Interactive, Inc. and United Video Satellite Group, Inc.* v. *StarSight Telecast, Inc.*, May 9, 1998, pp. 186-187, 295-315, and 352-357.

Various publications of Insight Telecast, 1992 and 1993.

Veith, R.H., "Television's Teletext," Elsevier Science Publishing Co., Inc, 1983, pp. 13-20, 41-51.

Videocipher Stipulation, May 1996.

VideoGuide, "VideoGuide User's Manual," pp. 1-27 (p. 11 is the most relevant).

W. Leo Hoarty, "Multimedia on Cable Television Systems," Symposium Record Table TV Sessions, 18th International Television Symposium and Technical Exhibition, Montreux, Switzerland, Jun. 10, 1993, pp. 555-567.

Wittig et al, "Intelligent Media Agents in Interactive Television Systems," Proceedings of the International Conference on Multimedia Computing and Systems, Los Alamitos, CA, US, May 15-18, 1995, pp. 182-189, XP 000603484.

Yee Hsiang Chang et al., "An Open-Systems Approach to Video on Demand," IEEE Communications Magazine, May 1994, pp. 68-80.

Office Actions and Corresponding Replies in relation to U.S. Patent No. 7,398,541 issued Jul. 8, 2008.

Office Actions and Corresponding Replies in relation to U.S. Patent No. 7,487,529 issued Feb. 3, 2009.

Office Actions and Corresponding Replies in relation to U.S. Appl. No. 10/347,673 filed Jan. 17, 2003.

Oberlies, et al., "VPS-Anzeige Und Uberwachungsgerat", Rundfunktechnische Mitteilungen, vol. 30, No. 1, Jan. 1986-Feb. 1986, Norderstedt (DE), pp. 1-8.

International Search Report for PCT/US2006/030073 dated Jul. 7, 2008.

International Search Report for PCT/US1999/008842 dated Jul. 16, 1999 (references from Search Report previously cited).

International Search Report for PCT/US1999/004163 dated Jun. 23, 1999 (references from Search Report previously cited).

International Search Report for PCT/US1998/015093 dated Dec. 1, 1998 (references from Search Report previously cited).

International Search Report for PCT/US1995/011173 dated Dec. 14, 1995 (some references from Search Report previously cited).

Office Action mailed Apr. 29, 2010 in U.S. Appl. No. 11/894,590 filed Aug. 20, 2007 (now Abandoned).

Office Actions mailed Jul. 7, 2010, Jun. 9, 2009, Sep. 3, 2008, Jun. 12, 2008, Dec. 13, 2007, Jun. 19, 2007, Nov. 8, 2007 and Jun. 22, 2006 and Replies filed Dec. 17, 2010, Mar. 26, 2010, Feb. 25, 2009, May 13, 2008, Sep. 19, 2007, Apr. 18, 2007 and Sep. 22, 2006 in U.S. Appl. No. 10/066,811 filed Feb. 4, 2002 (currently pending).

U.S. Appl. No. 60/061,119, filed on Oct. 6, 1997, Ward et al.

| | | |
|---|---|---|
| 10:03PM 🔒 | ○ WATCH ○ RECORD | |
| PIP WINDOW | REMEMBER WENN: WENN SUPPLIES PROGRAMMING TO A RIVAL STATION. | |
| DISPLAYING PANEL AD VIDEO FOR LAST CHANNEL VIEWED | AMC [23] 9:00PM (30m) CC ℹ️ | |
| | GRID SORT SCHEDULE MESSAGES ▷ | |
| AD WINDOW 1 ℹ️ | | 9:00PM 9:30PM |
| DISPLAYING PANEL AD | SAT | |
| | LAST CHANNEL | EARLY EDITION |
| | ABC | MISS AMERICA PAGEANT |
| | FOX | AMER. MOST WANTED |
| | CBS | EARLY EDITION |
| | MTV | SPICE GIRLS CONCERT TONIGHT |
| AD WINDOW 2 ℹ️ | UPN | WALKING TALL ▷ |
| DISPLAYING PANEL AD | PBS | ON GOLDEN POND ▷ |
| | AMC | REMEMBER... YOUNG PHILA... ▷ |
| | ESPN | COLLEGE FOOTBALL |

*FIG. 1*

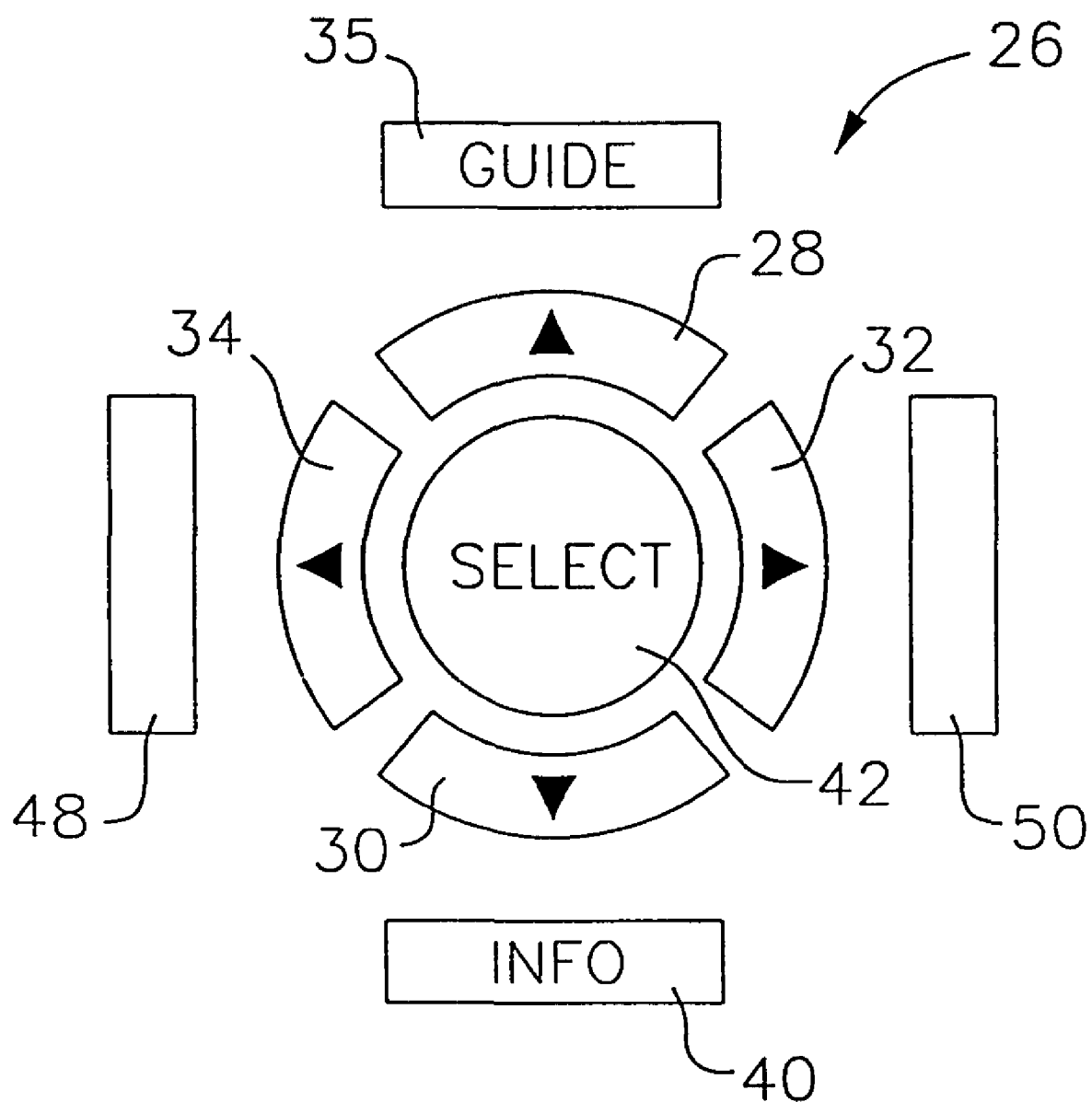

FIG. 3
PRE-ESTABLISHED TIME LIST

|   | 00-04 | 04-08 | 08-12 | 12-16 | 16-20 | 20-24 |
|---|---|---|---|---|---|---|
| 0 | $A_1$ | $B_1$ | $C_1$ | $D_1$ | $E_1$ | $F_1$ |
| 1 | $G_1$ | $H_1$ | $I_1$ | $J_1$ | $K_1$ | $L_1$ |
| 2 | $A_2$ | $B_2$ | $C_2$ | $D_2$ | $E_2$ | $F_2$ |
| 3 | $G_2$ | $H_2$ | $I_2$ | $J_2$ | $K_2$ | $L_2$ |
| 4 | $A_3$ | $B_3$ | $C_3$ | $D_3$ | $E_3$ | $F_3$ |
| 5 | $G_3$ | $H_3$ | $I_3$ | $J_3$ | $K_3$ | $L_3$ |
| ... | | | | | | |
| $Z_N$ | $A_N$ | $B_N$ | $C_N$ | $D_N$ | $E_N$ | $F_N$ |
| $Z_{N+1}$ | $G_N$ | $H_N$ | $I_N$ | $J_N$ | $K_N$ | $L_N$ |

N = THE MAXIMUM NUMBER OF CHANNELS

FIG. 4
SHOW_INFORMATION PACKAGE

| AMOUNT OF MEMORY USED |
| CONTROL DATE |
| VERSION NUMBER |

80 {
| MULTIPLE SHOW FLAG | START TIME |
| DURATION |
| THEME |
| CC | STEREO | ADD ONS |
| TITLE LENGTH |
| TITLE |
| PRIMARY DESCRIPTION LENGTH |
| PRIMARY DESCRIPTION |
| SECONDARY DESCRIPTION LENGTH |
| SECONDARY DESCRIPTION |
| VCR PLUSCODE LENGTH |
| VCR PLUSCODE |
| END OF SHOW = NULL |

81 {
| MULTIPLE SHOW FLAG | START TIME |
| DURATION |
| THEME |
| CC | STEREO | ADD ONS |
| TITLE LENGTH |
| TITLE |
| PRIMARY DESCRIPTION LENGTH |
| PRIMARY DESCRIPTION |
| SECONDARY DESCRIPTION LENGTH |
| SECONDARY DESCRIPTION |
| VCR PLUSCODE LENGTH |
| VCR PLUSCODE |
| END OF SHOW = NULL |

82 {
| MULTIPLE SHOW FLAG | START TIME |
| DURATION |
| THEME |
| CC | STEREO | ADD ONS |
| TITLE LENGTH |
| TITLE |
| PRIMARY DESCRIPTION LENGTH |
| PRIMARY DESCRIPTION |
| SECONDARY DESCRIPTION LENGTH |
| SECONDARY DESCRIPTION |
| VCR PLUSCODE LENGTH |
| VCR PLUSCODE |
| END OF SHOW = NULL |

FIG. 7
SHOW LIST

| Offset | 7 | 6 | 5 | 4 | 3 | 2 | 1 | 0 |
|---|---|---|---|---|---|---|---|---|
| 0x00 | | | | TYPE | = 0x02 | | | |
| 0x01 | | | | NBR B | LOCKS | | | |
| 0x02 | | | | //// | VERSION | | | |
| 0x03 | MSB | | | | | | | |
| ... | | | | START TIME GMT | | | | |
| | | | | | | | | LSB |
| 0x07 | | | START DELIMITER = 0xEE | | | | | |
| 0x08 | RESV | PPV | GRPF | DMYF | | | | |
| 0x09 | | | | DURATION | | | | |
| 0x0A | MSB | | | SHOW TITLE HANDLE | | | | |
| | | | | | | | | LSB |
| 0x0C | MSB | | | SHOW DESCRIPTION HANDLE | | | | |
| | | | | | | | | LSB |
| 0x0E | MSB | | | GROUP ID | | | | |
| | | | | | | | | LSB |
| ... | | | | END DELIMITER = 0xFF | | | | |

Offsets (right side): 0x00, 0x01, 0x02, 0x04, 0x06

FIG. 6
CHANNEL DATA TABLE

| Offset | 7 | 6 | 5 | 4 | 3 | 2 | 1 | 0 |
|---|---|---|---|---|---|---|---|---|
| 0x00 | | | | TYPE = 0x01 | | | | |
| 0x01 | | | | NBR BLOCKS | | | | |
| 0x02 | | | | 0x00 | | | | |
| 0x03 | | | | NBR CHANNELS | | | | |
| 0x04 | MSB | | | CHANNEL ID | | | | |
| | | | | | | | | LSB |
| 0x06 | DPF | ICF | NDF | //// | | NF | TMSB | |
| 0x07 | | | | TUNE CHANNEL NBR | | | | |
| 0x08 | | | | TRANSPONDER NBR | | | | |
| 0x09 | | | | SATELLITE NBR | | | | |
| 0x0A | //// | SOURCE | | CHANNEL TYPE | | | NMSB | |
| 0x0B | | | | NATIVE CHANNEL NBR | | | | |
| 0x0C | | | | NAME MASK BITS | | | | |
| 0x0D | | | | FAVORITES LINK | | | | |
| 0x0E | MSB | | | SHOWLIST HANDLE TABLE HANDLE | | | | |
| | | | | | | | | LSB |
| 0x10 | MSB | | | NAME AFFILIATION STRING | | | | |
| | | | | | | | | LSB |
| 0x18 | MSB | | | DUPLICATE CHANNELS HANDLE | | | | |
| | | | | | | | | LSB |

Offsets (right side): 0x00, 0x02, 0x03, 0x04, 0x05, 0x06, 0x07, 0x08, 0x09, 0x0A, 0x0C, 0x14

FIG. 8

SHOW TITLE ENTRY

| | 7 | 6 | 5 | 4 | 3 | 2 | 1 | 0 |
|---|---|---|---|---|---|---|---|---|
| 0x00 | \multicolumn{8}{l}{TYPE=0x50 NBR BLOCKS} | | | | | | | |
| 0x01 | CMPF | CCF | SF | BW/C | | REF CNT MSB'S | | |
| 0x02 | \multicolumn{8}{l}{REFERENCE COUNT} | | | | | | | |
| 0x03 | MSB | | | THEME INDEX ID | | | | LSB |
| 0x05 | \multicolumn{8}{l}{SHOW TITLE TEST} | | | | | | | |

FIG. 9

SHOW DESCRIPTION ENTRY

| | 7 | 6 | 5 | 4 | 3 | 2 | 1 | 0 |
|---|---|---|---|---|---|---|---|---|
| 0x00 | \multicolumn{8}{l}{TYPE=0x60 NBR BLOCKS} | | | | | | | |
| 0x01 | CMPF | CCF | SF | BW/C | | RF | REF CNT MSB'S | |
| 0x02 | \multicolumn{8}{l}{REFERENCE COUNT} | | | | | | | |
| 0x03 | MSB | | | THEME INDEX ID | | | | LSB |
| 0x05 | \multicolumn{4}{l}{CRITICS RATING} | MPAA | | | | |
| 0x06 | \multicolumn{8}{l}{TRAITS MASK BITS} | | | | | | | |
| 0x07 | \multicolumn{8}{l}{YEAR PRODUCED} | | | | | | | |
| 0x08 | \multicolumn{8}{l}{SHOW DESCRIPTION TEXT} | | | | | | | |

FIG.10

| START TIME |
| --- |
| DURATION 1 |
| AD ID 1 |
| DURATION 2 |
| AD ID 2 |
| ⋮ |

FIG.11

| AD ID 1 |
| --- |
| GUIDE CHANNEL |
| START TIME |
| DURATION |
| AD ID 2 |
| GUIDE CHANNEL |
| START TIME |
| DURATION |
| ⋮ |

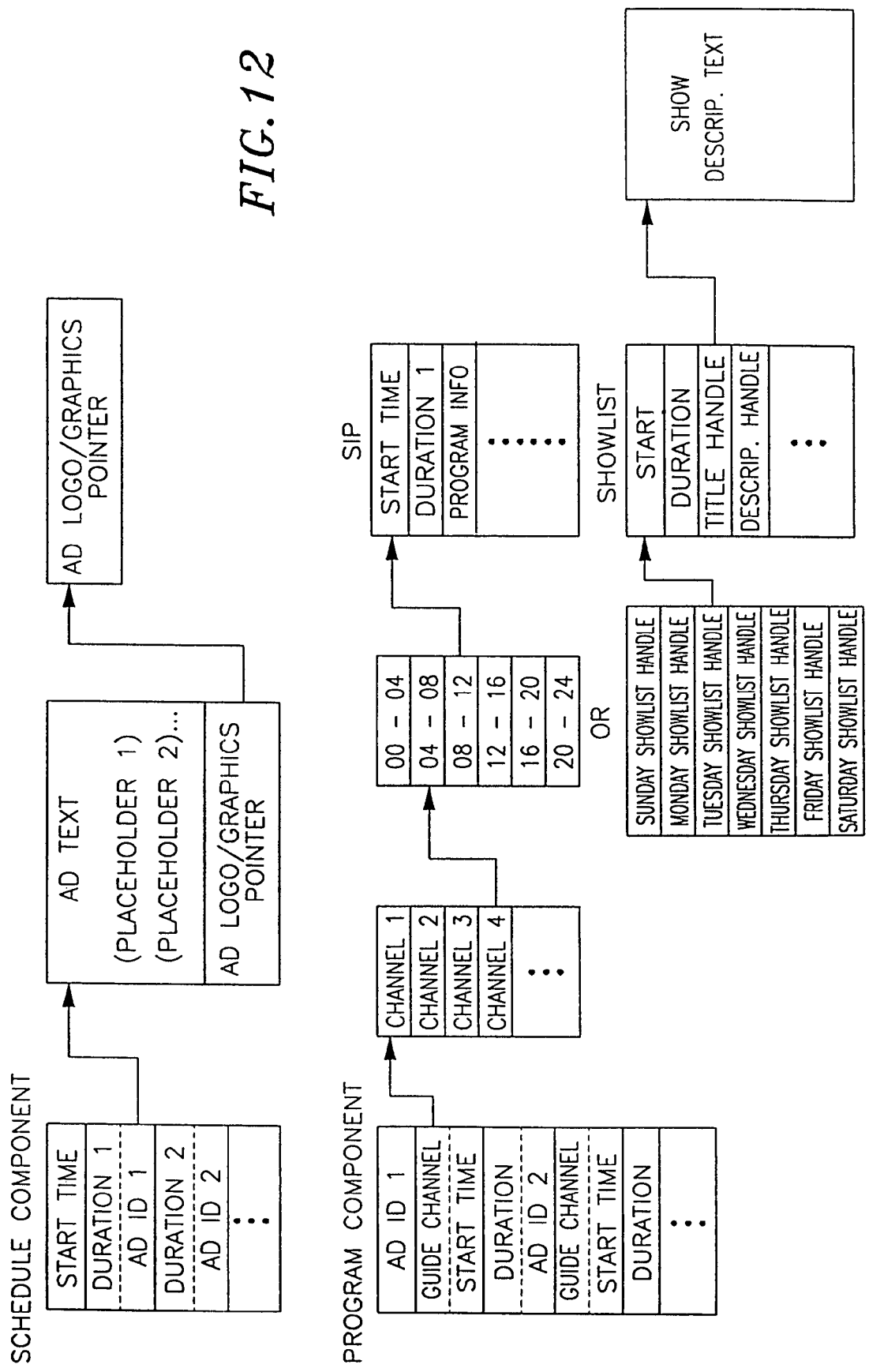

SYSTEM AND METHOD FOR UTILIZING EPG DATABASE FOR MODIFYING ADVERTISEMENTS

CROSS-REFERENCE TO RELATED APPLICATIONS

This patent application is a continuation of U.S. patent application Ser. No. 10/453,388, filed on Jun. 3, 2003, now U.S. Pat. No. 7,266,833, which is a continuation of U.S. patent application Ser. No. 09/604,038, filed on Jun. 27, 2000, entitled "SYSTEM AND METHOD FOR UTILIZING EPG DATABASE FOR MODIFYING ADVERTISEMENTS," now abandoned, and claims the benefit of the filing date of U.S. Provisional Patent Application Ser. No. 60/141,331, filed Jun. 28, 1999 and entitled "SYSTEM AND METHOD FOR UTILIZING EPG DATABASE FOR MODIFYING ADVERTISEMENTS," the entire contents of which are hereby expressly incorporated by reference. This application is also related to U.S. Pat. No. 6,177,931, issued Jan. 23, 2001 and entitled "SYSTEMS AND METHODS FOR DISPLAYING AND RECORDING CONTROL INTERFACE WITH TELEVISION PROGRAMS, VIDEO, ADVERTISING INFORMATION AND PROGRAM SCHEDULING INFORMATION," the contents of which are hereby expressly incorporated by reference.

BACKGROUND OF THE INVENTION

The present invention relates to receiving and displaying advertisements in an Electronic Program Guide (EPG). More specifically, this invention is directed to a system and method for utilizing data stored in an EPG database for modifying advertisement information.

U.S. Pat. No. 6,177,931, issued on Jan. 23, 2001, the contents of which are hereby expressly incorporated by reference, discloses an electronic program guide (EPG) with panel ad windows and channel ad tiles for displaying advertisement information. Typically, the advertisement information relates to future-scheduled television programs. For example, NBC might present a panel or tile advertisement of its show "Friends," as being shown every Thursday night on the local NBC channel.

Certain information in the advertisement, however, may vary each time the advertisement is transmitted, or differ based on the location of the receiving television system. For instance, "Friends" might be shown at 8:00 pm in California, but at 7:00 pm in Chicago. Thus, an advertisement displayed on a television system in California might read: "Watch Friends every Thursday night at 8:00 pm," while the advertisement in Chicago might state the same information (text and/or graphics), except that the airing time of the show will be different. Thus, for each of the different time zones, a service provider must create and transmit a different advertisement with the appropriate time information.

In addition to the above, the program description of an episode of a series of programs might differ on a daily, weekly, or bi-weekly basis. In such an instance, the service provider must transmit a new advertisement with updated program description information each time there is a change in the program description. Also, portions of information related to other ads, such as promoting a product or service may vary according to time zone, geographical regions, user preferences, and the like. Therefor, in the case of product/service advertisements, the service provider must also transmit a new advertisement with updated information each time there is a change in the price, telephone number, web site address, dates of promotions, and the like.

When advertisement information is transmitted via vertical blanking interval (VBI) signals which is a limited commodity, it is desirable to minimize the amount of advertisement information transmitted. With less transmitted information, the television systems that receive the information will also expend less memory in storing the information.

SUMMARY OF THE INVENTION

The present invention addresses and alleviates the above-mentioned deficiencies associated with the prior art. More particularly, the present invention comprises a system and method for utilizing data stored in an EPG database for modifying advertisement information. In this way, a service provider and/or an advertiser can transmit a single advertisement to all the television stations regardless of their geographic location and other user specific information, and need not re-transmit the advertisement even if there is a change in the show's program description. When the advertisement is displayed, the correct updated information is retrieved from the EPG database and inserted into the advertisement.

In one aspect, the present invention describes a method for displaying an advertisement in an EPG including the steps of: storing television schedule information in a database; receiving advertisement information; combining a portion of the received advertisement information with a portion of the stored television schedule information; and displaying the combined information in the EPG on a screen. In another aspect, the present invention describes a method for modifying an advertisement in an EPG comprising the steps of: storing television schedule information in a first database; storing advertisement information in a second database; incorporating a portion of the television schedule information into a portion of the advertisement information to form a modified advertisement; and displaying the modified advertisement on a screen.

BRIEF DESCRIPTION OF THE DRAWINGS

The objects, advantages and features of this invention will become more apparent from a consideration of the following detailed description and the drawings in which:

FIG. 1 is an exemplary illustration of an EPG display according to one embodiment of the present invention;

FIG. 2 is an exemplary remote controller according to one embodiment of the present invention;

FIG. 3 is an exemplary illustration of a pre-established time list according to one embodiment of the present invention;

FIG. 4 is an exemplary illustration of a show information package according to one embodiment of the present invention;

FIG. 6 is an exemplary illustration of a channel data table according to one embodiment of the present invention;

FIG. 7 is an exemplary illustration of a show list according to one embodiment of the present invention;

FIG. 8 is an exemplary illustration of show title entries according to one embodiment of the present invention;

FIG. 9 is an exemplary illustration of show description entries according to one embodiment of the present invention;

FIG. 10 is an exemplary illustration of a scheduling component of advertisement data packets according to one embodiment of the present invention;

FIG. 11 is an exemplary illustration of a program component of advertisement data packets according to one embodiment of the present invention; and FIG. 12 is an exemplary illustration of how information is retrieved from the database according to one embodiment of the present invention.

DETAILED DESCRIPTION OF THE INVENTION

Figure 5:
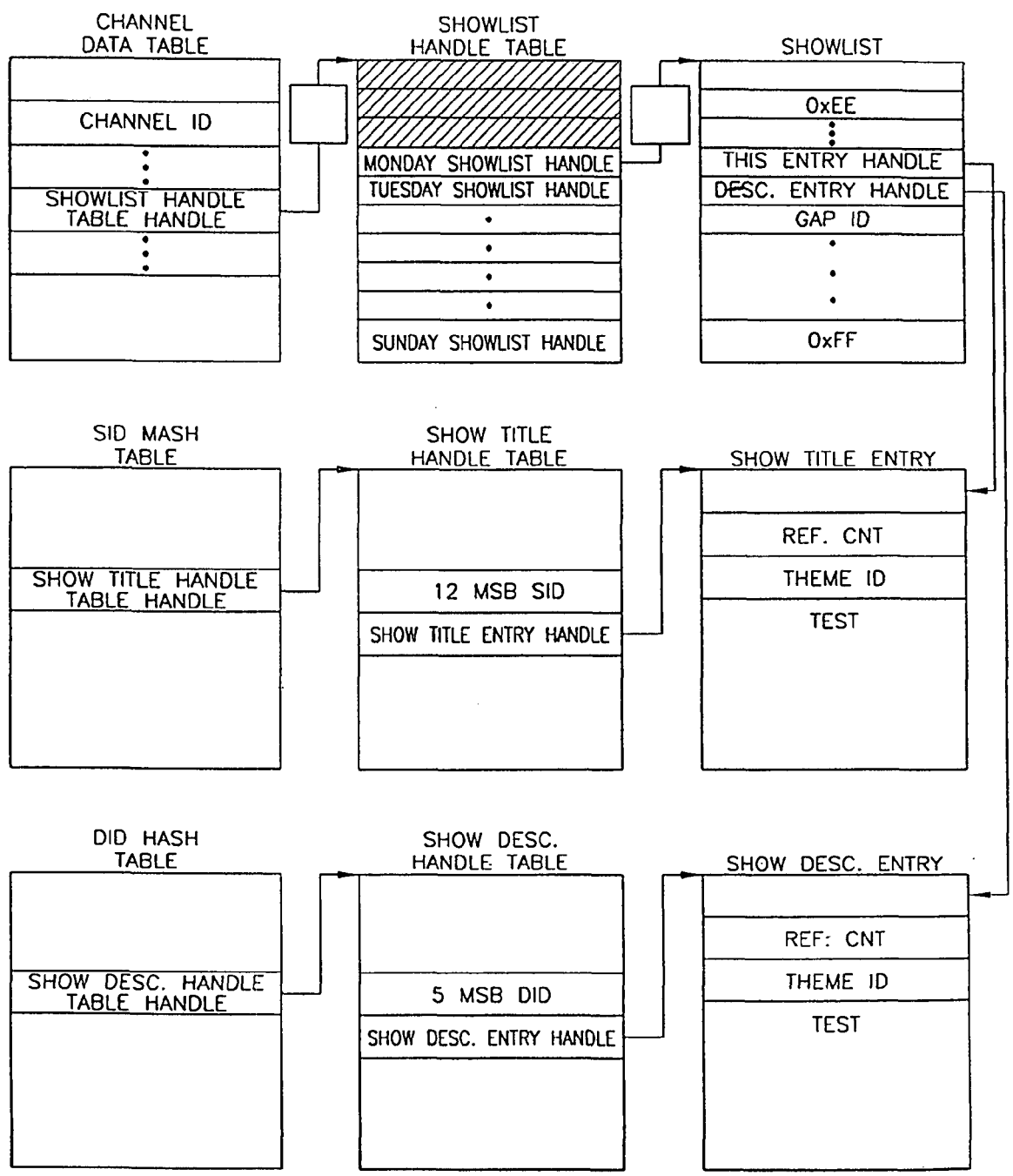
FIG. 5 is an exemplary illustration of a program schedule organization according to one embodiment of the present invention.

The present invention describes a system and method for utilizing data stored in an EPG database for updating advertisement information so that a single advertisement can be transmitted to all or many of the television stations regardless of their geographic location, and specifics of the advertisement. Before the transmitted advertisement is displayed, the updated airing time, program description, price, point of sales, and the like information is retrieved from the EPG database and inserted into the advertisement.

Although in the described embodiment, the airing time information and program description information might be modified, a person skilled in the art should recognize that any other advertisement data, such as graphics and any other text data, may be modified based on information stored in the EPG database. Furthermore, the advertisements modified may not only pertain to future or current television programs, but may be advertisements for any type of products or services.

Alternatively, the updating information may be transmitted in real time to the television system at the time the advertisement is displayed. In one embodiment, a portion of the advertisement information (e.g., the ad content) is transmitted in real time while another portion of the advertisement information, such as program information, program time, ad rotation information, and/or web site addresses are retrieved from the EPG database and are combined with the received advertisement information before a complete advertisement is displayed. Additionally, the advertisement content, including text and graphics may be transmitted in real time and be combined with EPG data before the advertisement is displayed.

FIG. 1 is an exemplary illustration of an EPG display. The EPG is displayed on a television screen generated by a conventional television receiver with interlaced scan lines. Alternatively, the display may be generated by a VCR or PC monitor with progressive scan lines. Two panel ad windows with advertisement information are located on the left side of the screen, and occupy about ⅑ of the total screen. The remainder of the screen area is typically occupied (moving from top to bottom of the screen) by an action key bar, an information box, navigation bar, and a grid guide. The grid guide includes a plurality of program tiles with program scheduling information. The grid guide might also comprise advertisement tiles also including advertisement information, as shown in FIG. 1. U.S. Pat. No. 6,177,931, mentioned above, provides a more detailed description of the grid guide including panel/tile advertisements and Internet connections.

Briefly, the EPG displays detailed information relevant to program listings in a detailed information area of a Grid Guide. The detailed information can include, a detailed textual description of the program, information about the actors and actresses, information about the production of the program, product related information, identification of relevant Internet web sites and online Internet chat rooms. The EPG provides the viewer with the ability to request detailed information from such guides/data services in a number of ways, including when the viewer highlights: a particular program in the Grid Guide, the Ad Window, or a Virtual Channel Ad Slot. In one embodiment, the viewer's remote control device has a power "Information" key. When the viewer has navigated the on screen highlighting/cursor to a particular tile or window on the EPG on screen display, the viewer can press the remote control device "Information" key to request the additional information.

In one embodiment, when the viewer highlights a particular program in the Grid Guide, the Ad Window, or a Virtual Channel Ad Slot, or other requests to access detailed program-related information, the EPG connects the viewer with an external database of information, such as with a particular web site on the Internet. The viewer can instruct the EPG to connect the user with detailed specialized information guides/data services, such as sports, news, or other guides/data services. In one embodiment, the linking to the external data source is accomplished by storing a web site address (Uniform Resource Locator, 'URL') with the Ad Window or Virtual Channel Ad Slot advertisement in the RAM of the user terminal. This web site address may be modified in the RAM, while the ad content and/or graphics stays the same. For example, if a web site address for a vendor is changed while the product and its description may stay the same, the ad content remains unchanged in the advertisement database, while only the new web site address is transmitted to be combined and displayed with the ad information.

A sports program listed in the Grid Guide provides an illuminating example of how the viewer interacts with such a detailed specialized information guide/data service. When the viewer highlights a football game listed in the Grid Guide, the normal detail concerning the program is displayed in the detailed information are of the Grid Guide. Furthermore, multiple icons related to the highlighted program can be displayed in the Grid Guide. One icon alerts the user that the game is already underway. Another icon indicates the availability of specialized guide information. The viewer can select the program from the Grid Guide for viewing and/or recording. In addition, the viewer can select the specialized guide icon. In the case of a sports program, selecting the specialized guide icon would display, for instance, a scoreboard for the game if the game were already in progress in the detailed information area of the Grid Guide. If the game were scheduled for a future time, then selecting the specialized guide icon would display, for instance, information about the players, the teams, and perhaps, the odds about the game.

Another icon including one or more URLs, displayed for instance in the display of the sports guide scoreboard, provides the viewer with the option of connecting to the Internet, for example, to a particular web site that provides additional information about the game, possibly, including online chat about the game. In one embodiment, the EPG switches to full screen to display of the Internet web site. In another embodiment, the EPG displays the Internet web site in the area of the screen previously occupied by the Grid Guide and/or the Grid Guide and the Ad Window, while continuing to display the real time video display of the currently tuned television program in the PIP window. Alternatively, the EPG can display the Internet web site in the PIP window and display the currently tuned television program in the area of the screen previously occupied by the Grid Guide and/or the Grid Guide and the Ad Window. The Internet web site to which the EPG initially connects (the "contact web site") may be a specialized directory, using pre-determined hyperlinks to the viewer to other cites of interest. The contact web site may additionally, or in the alternative, offer search capabilities to the viewer to locate information of interest.

Once the viewer is connected with a specialized information guide/data service, the viewer can use the guide/data service to direct the viewer to particular information contained in the EPG Grid Guide. For instance, a viewer selects a news program to watch and while watching the news program, the news broadcaster describes an event involving astronauts. The viewer selects the news guide/data service icon and connects to a web site on the Internet describing, among other things, additional information about the particular event involving the astronauts. The viewer may also use the search engine offered by the contact web site to locate additional information about the same astronauts. At the subsequent web sites, a Discovery Channel program is mentioned concerning some of the same astronauts. The viewer can instruct the EPG to locate any occurrence of the referenced program and to schedule that program to be recorded. In one embodiment, a PLUS CODE-like address is used to link to, or record, the scheduled program.

The viewer can search an index, available on the Internet and created by a news data service, of recorded television news programs and reports. If the viewer selects one of the indexed reports, a video clip of the indexed report is shown in the area on the screen occupied by the Internet web site display, or any alternate area or portion of the on-screen display. The viewer can instruct the EPG to record the video clip.

The EPG is capable of integrating additional information provided by the special data services into the EPG display. For instance, in the case of a sports data service, the EPG can format the program listing display and/or the sports scores for a game with special color coding depending upon the stage of the game. For instance, if the game is in progress, the EPG formats the program listing and/or the sports scores for that game with one color, e.g., green; if the game is completed, the program listing and/or the final scores can be in a different color, e.g., blue. If the game is in progress, the viewer can highlight and select the box score to move from the box score to the game shown on the television. In one embodiment, the selected television sports program appears in the PIP Window or the Ad Window, allowing the viewer to read the sports program-related story in the sports guide while watching the corresponding television sports program.

The EPG is further capable of linking between news items in a special news guide and related television programs. The viewer can link to a news program to watch or record that program by highlighting and selecting a news item in a news guide. In one embodiment, the selected television news program appears in the PIP Window or the Ad Window, allowing the viewer to read the story in the news guide while watching a television news program that reports on the event.

In one embodiment, the VBI for selected channels is dedicated to the delivery of a special data service. For instance, the ESPN VBI would carry the sports data service only. In one embodiment, as an incentive to carry this data, the data service would display the ESPN Television program in the PIP window. Since the tuner must be set to ESPN to capture the data, the television signal is available for display in the PIP.

The EPG provides producers of infomercials with extended capabilities to reach the viewers through the Ad Window. Because of the cost of buying advertising time, a growing number of product manufacturers and marketers produce infomercials about their products and then buy relatively inexpensive air time for their infomercials according to off-prime-time schedules, often on non-prime channels. The EPG provides the producers of infomercials with the opportunity to provide the viewer with the opportunity to record an infomercial that is broadcast at a time, or on a channel, that would be inconvenient for the viewer to watch real-time.

If the Ad Window displays information about a particular product, pressing a record button instructs the EPG to record an infomercial or advertisement, to the extent that one is scheduled for a future time. Alternatively, the viewer can designate the infomercial or advertisement for the Watch List. Moreover, the EPG may provide the producers of infomercials with the opportunity to provide the viewer with the opportunity to view a video clip about the product being advertised.

In one embodiment, the video clip associated with the product and/or program displayed in the Ad Window is shown when the viewer highlights the Ad Window. Depending upon the embodiment and/or viewer option selections, the video clip is shown in the PIP window, in the Ad Window, or full screen. At the conclusion of the video clip, the EPG typically returns to the mode in which the viewer was operating immediately before selecting the option that triggered the display of the video clip.

The EPG provides distributors of television programming with additional opportunities to reach the viewer. The Ad Window can display information about a future-scheduled television program. If the viewer is interested in recording the program, the viewer can take a number of alternative actions. For instance, in one embodiment, the viewer can instruct the EPG to record the future-scheduled program. Additionally, the viewer can instruct the EPG to add program to the Watch List. Alternatively, the viewer can instruct the EPG to display a video clip about the program. Yet further, the viewer can instruct the EPG to connect the user with detailed specialized information guides/data services, such as sports, news, or other guides/data services. The EPG provides the viewer with the ability to request detailed information from such guides/data services in a number of ways, including when the viewer highlights: a particular program in the Grid Guide, the Ad Window, or a Virtual Channel Ad Slot. In one embodiment, the EPG displays relevant detailed information in the detailed information area of the Grid Guide. In another embodiment, the EPG connects the viewer with an external database of information, such as with a particular web site on the Internet.

In one embodiment, Panel ads occupy a fixed area in the Guide and are generally filled with paid advertisements. As shown in the exemplary illustration of the EPG of FIG. 1, located directly below the PIP in an Ad Window, space is available in the Guide for two Panel ads. Each Panel ad occupies approximately ⅕th of the total screen area. When a given ad space is not sold, the space may be filled with a Placeholder ad, stored in ROM, and inserted in the available space, or with a bonus ad.

In one embodiment, all Guide screens are made up of "hard pages." A hard page is defined as an area comprising 9 channel slots. Each time a user scrolls below the 9*x channel slot, a new "hard page" appears. Scrolling back up brings the previous hard page back into view. Each hard page may have different Panel ads associated with it. In one embodiment, Hard pages are defined differently in the Sort screens. Each sort category (e.g. Movies, Sports, Children's) is considered one hard page regardless of the number of items in the list vertically. As the user moves horizontally from one category to the next, the Panel ads also changes.

The number of hard pages available depends on the size of the user's lineup and the number of channels turned on or off. In the event that there are not enough channels to support the number of hard pages required for the number of Panel ads sold, not all Panel ads are displayed. For example, assume that 4 pairs of Panel ads and 4 Channel ads are saved in memory. Additionally, assume a particular user has 20 active channels in his channel lineup. Then the ads would be displayed as follows:

Panel ad Pair 1 with channels 1-8 and the first Channel ad
Panel ad Pair 2 with channels 9-16 and the second Channel ad
Panel ad Pair 3 with channels 17-20 and the third and fourth Channel ads If the user turns on more channels requiring the addition of a fourth hard page, then the fourth Panel ad Pair becomes visible.

In one embodiment, the user can highlight these ads, resulting in the automatic display of an expanded information box. This expanded information box may cover the entire right-hand ⅔rds of the grid. The user closes the expanded information box by moving the highlight off the Panel ad or by pressing the information button after the last related information box screen has been presented. In one embodiment, there can be multiple information "screens" displayed sequentially in the expanded information box. Pressing the Info. button while an ad is highlighted accesses these additional screens. There is no finite limit to the number of additional screens; memory limitations and selling requirements limit this number.

In one embodiment, if a Panel ad is highlighted, has show information associated with it, and the advertised show is currently on, the user may tune directly to the related program by pressing a button. Pressing the button also places the show in a Record/Watch Schedule for the duration of the show to allow the user to set the frequency to daily or weekly. If the show is not currently on, pressing a button places the show in the Record/Watch Schedule or; pressing another button tunes to the channel related to the show in the ad. Shows added to the Record/Watch Schedule may be set to be viewed: once, daily, or weekly. The Watch feature and the related Action button labels operate in the same way as if scheduling a show to watch from the Grid.

In one embodiment, if a Panel ad has show information associated with it, the show may be recorded by highlighting the ad and pressing an Action button. If the show is on now, recording begins immediately and the show is placed in the Record/Watch Schedule for the duration of the show to allow the user to set the frequency to daily or weekly. If the show is on in the future, that show is added to the Record/Watch Schedule for auto-recording. Shows added to the Record/Watch Schedule may be set to be recorded: once, daily, or weekly. The Record feature and related Action button labels operate in the same way as if scheduling a show to record from the Grid.

In one embodiment, Panel ads can be dynamic. There are two areas which may be dynamic: 1.) the Panel ad space; and/or 2.) the Information box. The Panel ad area may change over time, e.g., every x seconds rotating through a plurality of different graphical or textual ad executions in the Panel ad space. When a Panel ad is highlighted, the ad rotation stops on the currently displayed ad visual. The dynamic rotation does not restart until the Panel ad is de-highlighted.

The information box text associated with the Panel ad may change over time, e.g., every y seconds, rotating through a plurality of different screens of text. The screen rotation stops if the user presses the Info. button, displaying the first page of info. text. This option is available for advertisers to rotate different headlines in the information box. The user may view subsequent pages by pressing the Info. button again. The screen rotation does not restart until after the Panel ad is de-highlighted.

In one embodiment, the EPG provides producers of infomercials with extended capabilities to reach the viewers through Virtual Channel Ad Slots, also referred to as Channel ads. Virtual Channel Ad Slots appear as rows of the Grid Guide and typically show the titles of the programs that are scheduled for a particular channel. The EPG Grid Guide's Virtual Channel Ad Slots provide advertisement to be displayed as a row in the Grid Guides schedule of programs. The Virtual Channel Ad Slots may be used to provide multiple exposures of a particular program in the guide. The Virtual Channel Ad Slots act like a channel entry in the Grid Guide in that the viewer can record, watch, schedule for watching, and/or get information about the advertised program in the information detail box of the Grid Guide.

In FIG. 1, the "MTV" tile shows an example of a Virtual Channel Ad Slot for an ad for a television program—it is a program listing that is out of place channel-wise and time-wise in the Grid Guide. That is, it does not appear in the usual channel position or time position in the guide, but the tile is otherwise like the other program listing tiles of grid guide (including height), except that it occupies the entire width of the tile irrespective of the duration of the program. A tile for a normal program listing scrolls off the screen as the up and down arrow keys are pressed. In contrast, in one embodiment, a Virtual Channel Ad Slot, such as shown, remains on the screen at all times as the up and down arrow keys are pressed, so the ad remains in view at all times in this embodiment.

Channel ads typically do not occupy a fixed area. Channel ads are essentially inserted between channels in the grid. If there are no Channel ads sold, the grid is simply a continuous list of channels/show tiles with no gaps. As these channel ads take up a channel slot in the grid, it is desirable to limit how many are likely to appear on any one screen to ensure the Guide is a useful source of Television programming information. Typically, there is approximately 1 Channel ad per hard page. Channel ads are typically the height of a channel slot, the width of the grid and are intermingled with the channel listings. There are several types of Channel ads, including: Relative, Parent, and Fixed position Channel ads.

Relative Channel Ads appear in a position relative to the top of the grid and are spaced every n channel slots, where n is some number. These ads appear and disappear as the user pages through the Guide's hard pages. A location for the first ad can be selected on the first page and subsequent ads follow every n channel slots. The same ad is repeated every $n^{th}$ slot. This method of repeating every $n^{th}$ channel slot is true for both PIP and non-PIP versions. Typically, as a user turns channels off, the spacing of these ads remains constant (every n channel slots). In the event that there are not enough channels to continue this spacing, ads appear at the end of the grid listings.

Parent Channel ads are related to a specific channel located directly above the ad. A Parent Channel ad is attached to its adjacent "parent" channel (that is, the ad follows the parent channel). As it is desirable to limit the number of Channel ads seen on any one screen, the number of Parent ads are typically limited. Additionally, if the parent channel is turned off, the ad is typically displayed at the bottom of the grid. Fixed Position Channel ads are located in one specific location, y (where y is some number) channels down from the top of the grid. If y is greater than the number of channels in the grid, the ad will be located at the end of the grid.

In one embodiment, Channel ads page vertically along with the channel listing information. These ads remain in a fixed position when the grid is scrolled horizontally. The user can highlight these Channel ads just as any show title can be highlighted. When highlighted, these Channel ads display additional information in the info. box just as when any channel is highlighted.

Channel ads are typically surrounded by bevels just like any show tile. Channel ad highlighting is typically similar to Panel ad highlighting. In one embodiment, when a user highlights a Channel ad, the bevels change to a flat (non-beveled) yellow border. When a Channel ad show is set to record the border turns red (dark red when not highlighted, light/bright red when highlighted). When a Channel ad show is scheduled to watch, the border turns orange (dark orange when not highlighted, light/bright orange when highlighted). In one embodiment, Channel ads can have multiple, sequential-info. box "screens" of information. The availability of this additional information is indicated by an "i" icon. The user can access the additional information by pressing the info. button. Channel ads can be dynamic.

In one embodiment, when the Guide is first setup, the initial download of information will not have been received. The Panel ad spaces are filled with Placeholder ads that are stored in ROM. These ads are typically "timeless" as they appear each time a Television is set up, either for the first time or after a power outage. One use for the Panel ad space is for help text. Help text that draws the user to select the ad space could serve as a "tutorial" on how to access Panel ads, the additional information on info. screens, and how to Watch and Record from ads.

When the viewer first enters the EPG, the EPG can display a full screen ad, such as an ad that would be displayed in the Ad Window. The viewer can interact with the full screen ad in the same manner in which the viewer can interact with the Ad Window. That is, the viewer can instruct the EPG to record, or to add to the watch list, the infomercial or program, if there is one, that is associated with the advertisement.

Rather than have the last channel watched as the first channel tuned the next time that the viewer turns on the television, a channel selected by the viewer could be automatically tuned. In one embodiment, the viewer indicates the Automatic watch channel in the Watch List Function of the EPG. In another embodiment, a broadcaster sends an on-screen query to each viewer to enter a command if the viewer wants the broadcaster's channel to be the first watched channel when the viewer first turns on the television.

Ads may feature, among other things, a graphics field, a text field or a combination of a graphics and text field. In one embodiment, the viewer can interact with the ads and the television. For instance, Tune-in ads allow the viewer to tune directly to a show in progress from a highlighted ad block assuming the ad block has program information associated with it. An in-progress show associated with an ad is directly tuned by pressing a button.

Direct-record ads allow the user to record a show in progress or scheduled to be on in the future from a highlighted ad block. There is no practical limit on how far into the future a direct-record associated show may be scheduled to air. A show associated with an ad is recorded by pressing an Action button while the ad is highlighted. The user may select a record frequency of once, daily or weekly. From an ad, the user presses the Action button to place the show in the Record Schedule. In the event that the show is currently on, pressing the Action button while highlighting an ad allows recording of the show in progress. The show title is also placed in the Record Schedule until the show ends in the event the user wishes to modify the record frequency to daily or weekly.

Watch ads consist of a program advertised in any ad space. The program advertised may be placed into the Watch Schedule as long as the ad block has program information associated with it. There is no practical limit on how far into the future an associated show may be scheduled to air. The Watch feature operates much the same way as the Record feature, except that it tunes the Television to the show rather than recording it. If a user is watching Television, the channel automatically changes to a show placed in the Watch Schedule when the show begins. If the Television is turned off when a show in the Watch Schedule is scheduled to begin, the Television is turned on and tuned to the desired channel.

The user may select a watch frequency of once, daily or weekly. From an ad, the user presses an Action button to place the show in the Watch Schedule. In the event that the show is currently on, pressing the Action button while highlighting an ad results in tuning directly to the show. The show title is also placed in the Watch Schedule until the show ends in the event the user wishes to modify the watch frequency to daily or weekly.

Ads may have multiple levels of information. Typically, First Level Information is the ad copy and/or graphics that are presented on screen with no user action. This comprises the Panel and Channel ad areas. Typically, Second Level Information (if provided by the advertiser) is automatically made visible ("Auto-Open") when the user highlights an ad block by scrolling onto it. This secondary information is presented in the info. box when a Channel ad is selected and in an automatically expanded version of an info. box that covers the entire channel grid area when a Panel ad is highlighted. An "i" icon on the ad, placed at the advertiser's discretion, indicates there is more information available for that ad. The second level information may be text and/or graphics depending on memory availability.

Typically, Third Level Information (if provided by the advertiser) availability is indicated by the info. button "i" on a Second Level information screen. Pressing the info. button accesses this information and cause the information box to expand for Channel ads to cover the entire grid area. This information can be multiple pages long. Pressing the info. button successive times cycles the user through the multiple pages. Pressing the info. button from the last available screen causes the information box to contract to its original size for all ads. The third level information may be text and/or graphics depending upon memory capabilities.

Ad Blocks can be dynamic. Memory permitting, the Panel ad graphics and/or text and information box text may change every X (where X is some number) seconds rotating through a limit of N (where N is some number) different graphical or textual executions. There is the capability to limit the number of dynamic ads displayed at any one time.

Ad duration and start time/end time can be scheduled and/or dynamic. In one embodiment, ads are to be displayed at a given start time with a related end time. The time between the start and end is the ad's duration. The minimum duration increment is typically 60 seconds. In one embodiment, an ad is not replaced automatically when an ad's end time arrives. Ads only change when the user's actions cause a new "hard page," or new section of the guide to appear (e.g., going from the Grid to Sort).

In one embodiment, ads can rotate. For example, different ads can appear each time the user enters the same page/section of the Guide. There is no hard limit on the number of ads placed in rotation. Ads can be assigned a priority with the ad of the highest priority being displayed the first time a hard page or section is accessed. Then the second priority ad is displayed the next time the user views this page and so forth. The priority counter is page dependent, meaning that if the user views the first page for a third time, they see the third priority ad on that page and if they then scroll to the second page for the first time, they see the first priority ad on the second page.

Ads may differ by the section of the Guide being viewed. For example, if a user is viewing the Sports theme area, an ad for ESPN Sports Center may appear, whereas a different ad was presented when the user was on the main grid.

The EPG can determine which advertisements to display depending upon the advertisement being displayed on the television channel that the viewer was watching immediately before entering the EPG. That is, if a Toyota advertisement was being shown on the channel that the viewer was watching at the time that the viewer entered the EPG, then the EPG can be timed to display a correlative Toyota advertisement in some portion of the EPG, e.g., the Ad Window.

In one embodiment, the EPG tests a Viewer Profile to determine which ad to display at various times during the viewer's session with the EPG. The EPG can assign Ad and Page priorities to represent the advertisers' investment and the relative viewer's profile.

Graphically dynamic ads typically present different graphics every x seconds (where x is some number, with x as small as 1.0 second) rotating through n (where n is some number) graphical or textual executions. Typically, only a limited number of these ads are displayed at any one time (likely a maximum of 1 per screen) as busy screens decrease the effectiveness of the ads and the utility of the Guide. Ads must be "identifiable" and "accessible" once placed in memory in order to allow advertisers to "pull" an ad, to update an ad, or to correct errors in transmission.

The viewer can highlight the Ad Window to locate additional information about the product advertised. In one embodiment, the viewer highlights the Ad Window by pressing the arrow/directional navigational keys of the remote control device to navigate the remote control device pointer to the location of the Ad Window on the on-screen television monitor display. When the remote control device pointer is located at the Ad Window on the on-screen television monitor display, the on-screen display of the Ad Window is highlighted. Alternatively, the EPG provides the producers of infomercials with the opportunity to provide the viewer with the opportunity to view a video clip about the product being advertised.

The Ad Window can be optionally interactive. The Internet address of a web site containing information relevant to the ad being displayed in the Ad Window can be displayed in the Ad Window as a web site address, as an icon, or in some other graphical presentation, such as a stylized "i" indicating additional interactive information. Furthermore, the viewer's interaction with the Ad Window is monitored by the EPG to record as part of the viewer's profile.

The EPG provides viewers the opportunity to access extended product information about which the viewer is interested. Because of the cost of buying advertising time, a growing number of product manufacturers and marketers produce infomercials about their products. Because of the cost of air-time, many manufacturers and marketers buy relatively inexpensive air time for their infomercials according to off-prime-time schedules, often on non-prime channels. The EPG provides the viewer the opportunity to record an infomercial that is broadcast at a time, or on a channel, that would be inconvenient for the viewer to watch real-time. If the Ad Window displays information about a particular product, pressing a record button instructs the EPG to record an infomercial, to the extent that one is scheduled for a future time. Alternatively, the viewer can designate the infomercial for the Watch List.

The EPG provides viewers with additional opportunities to instruct the EPG to record or watch a future-scheduled television program. The Ad Window can display information about a future-scheduled television program. If the viewer is interested in recording the program, the viewer can instruct the EPG to record. the future-scheduled program. In one embodiment, the viewer presses record button on the remote control device to instruct the EPG to record the future-scheduled program. Alternatively, the viewer can instruct the EPG to add program to the Watch List. Additionally, the viewer can view a video clip about the program.

In one embodiment of the invention, a data base of advertising messages and virtual channel ads is stored in RAM at the viewer terminal or is accessible at a web site if the viewer terminal has an Internet connection. In either case, the advertising items in the data base are labeled with coded categories that correspond to coded category labels assigned to the telecast television programs. (Preferably, these are the same categories that are used to sort the programs in the on screen category or theme guide.) The category labels of the television programs could be stored in RAM as part of the EPG data base and retrieved from the applicable Show Information Package ("SIP") based on the information from the real time clock and the tuner setting. This information identifies a time and channel that points to the applicable SIP. After the category label of the last program the viewer was watching in the television mode is retrieved from the EPG data base, this label is matched to the corresponding label in the data base of advertising messages and virtual channel ads stored in RAM.

The EPG uses a Viewer Profile information in connection with "adjacent-content" customization of the advertising messages displayed by the EPG. Viewer Profile information includes identification of the content that the viewer has currently highlighted in the EPG or related data service. Using this method, the EPG displays different advertisements depending upon, e.g., which show the viewer has currently highlighted in the Grid Guide, what sport is highlighted in a sports data service; or what type of news is highlighted in a news service (international, local, etc.).

The EPG can select advertisements from various possible locations, including a library of advertisements stored at the viewer's terminal in RAM that have been downloaded through the VBI, stored at the head-end, or accessible through an EPG link to the Internet/World Wide Web. The advertisements may be in the form of graphics, text, video clips, audio clips, and combinations thereof. Each advertisement can be assigned theme codes, profile codes, and other selection intelligence. In one embodiment, in order to customize the advertising display, the EPG searches the library of available advertisements to locate advertisements that match criteria set by the advertisers for "access content," "adjacent content," and/or Viewer Profile information. In another embodiment, the EPG selects advertisements for display according to pre-established selection criteria. In one embodiment, the advertisements in the library are assigned to themes; the history of use of an on-screen theme menu or program guide is recorded; and the history is analyzed by the EPG microprocessor to decide which advertisement to display.

For example, a particular advertisement for automobiles might be assigned to a sports event theme. In a simple implementation, this automobile advertisement would be selected for display, if the users of the particular EPG selected sports as a theme more frequently than any other theme during a prescribed period of time. Selecting a theme brings up a screen listing, by time, channel, and title, of the programs that are consistent with the selected theme on a second-level theme screen. The history of use could be recorded in a memory by overwriting the oldest data stored in the memory. If desired, a more sophisticated analysis could be used. Thus, the frequency of selection could be weighted to favor more recent selections over older selections or themes could be combined to determine which advertisement to display.

In another embodiment, the advertisements in the library are assigned to particular television programs or classes of television programs; the history of use of the information box of the EPG is recorded, in terms of frequency of the visits, time spent during a single visit, and/or total time of all the visits; the information boxes are correlated to the television programs, and the results are analyzed to decide which advertisement to display. Instead of the information box, any other area of the EPG screen could be monitored in similar fashion to decide which advertisement to display. In each case, the advertisements in the library are assigned to the types or subjects of information displayed in the monitored area so as to target better the advertisements to the interests of the users.

In another embodiment, the advertisements in the library are also assigned to particular television programs or classes of television programs in terms of channel and time; the tuner is monitored; the channel and time are correlated to the television programs, and the results are analyzed to decide which advertisement to display. For example, an advertisement for brand name athletic shoes with a popular basketball star could be assigned to basketball programs. The shoe advertisement would be selected for display if the viewer of the particular EPG entered the EPG while watching a basketball game.

In another embodiment, the advertisements in the library are also assigned to particular television programs or classes of television programs; the history of television programs entered into a "record-watch list" is recorded; and the results are analyzed to decide which advertisement to display. The time of the monitored event can also be taken into account in order to distinguish between multiple users of the same EPG or related television receiver. The assumption is that the people using the EPG and watching television at different times of the day have different interests—housewives may use the EPG more in the morning, children may use it in the early evenings, and men who work outside the home may use it on Sunday afternoons.

FIG. 2 is an exemplary embodiment of a remote controller for activating the functions of an EPG within a television system. For the purpose of describing the operation of the invention, it is assumed that the remote controller sends IR commands to a microprocessor in the television system that is programmed to carry out the described operations with the aid of a clock. The remote controller has up, down, right, and left arrows keys for controlling the movement of a cursor on the EPG. The cursor can select, i.e., highlight, any of the windows and tiles on the EPG by pressing the arrow keys on the remote control. Highlighting is effectuated by adding a border around the window or changing the color of the border, if the border is permanent.

Television program data is received by the television system in packets and stored in the EPG database. The packets are sent via VBI signals and received by the television system's microprocessor. A packet contains television program schedule information along with routing data that enables the system to determine how to store the information in memory.

Television program data is stored in data structures within the EPG database that enable the system to interpret the data. Details on the content and organization of the packets and the EPG database is discussed in more detail in U.S. application Ser. No. 08/987,795, Abandoned, and U.S. Pat. No. 6,239,794, the contents of which are hereby expressly incorporated by reference.

According to one embodiment of the invention, data structure for storing EPG data includes a pre-established time list and show information packages. The pre-established time list is used to locate television program information for each channel in the system. The pre-established time list only references program information that will be broadcast on the current day (today) or on the next day (tomorrow).

FIG. 3 is an exemplary illustration of a pre-established time list. This list contains a set of twelve pointers 313 for each channel in the system. Each pointer corresponds to a show information package that contains data for a four hour block of television programming. For example, in FIG. 3, the pointer E1 corresponds to program data from four p.m. to eight p.m. for the first channel. Pointers A2 through L2 are used to represent the program data associated with the second channel in the system. Twelve pointers represent 24 hours of programming information for the current day and 24 hours of program information for the next day.

Each pointer contains an address of a show information package of variable length containing actual television program data. When specific data is needed, the system first looks in the pre-established time list to secure the pointer, then uses the address found in that location to determine where the data is actually stored. For example, if data for the second channel in the system is needed for a television program between eight p.m. and twelve midnight, the system uses the address in pointer F2 to determine the location of the show information package containing the data.

Show information packages are variable length data structures that contain actual television program schedule data. Each show information package contains data for a four hour block of television programming for a specific channel. The show information package length is variable because the number of shows in each four hour block depend on the durations of the individual shows.

FIG. 4 depicts a show information package. The show information package contains the following: amount of memory—used to determine how much space was used to store the show information package and therefore, how much space is freed up after the show information package is no longer needed; control date—used to determine whether the data in a specific show information package is for the current day, the next day, or outside of the current two-day window; and version number-used to specify the specific version of the program data.

Following these three fields is specific data for each show that fits within the four-hour time block. For a given show, represented by block 314, the following fields are present in the show information package: multiple show flag field—used to determine if this show is the last show within the package, or if there are other shows following to be processed; start time field—an offset from the start time of the four-hour block, this offset is added to the time of the four-hour block to determine the start time of the show; duration field—specifies the air time for the particular show; theme field—contains information on the type of show; for example, the show may be a sporting event, a news program, or a movie; CC field determines whether or not the show is closed captioned; stereo field—determines whether or not the show is broadcast in stereo; add-ons field—is a field left for expansion, this field contains more information about the show as that information becomes standard in the art.

Following these fields are fields representing program title, primary description—a short description of the program, secondary description—a longer description of the program and VCR+PLUSCODE. Each of these items are represented by two fields, one containing the length of a specific item, such as title length, and one containing the item itself, such as title.

Following this information is an end-of-show field. The end-of-show field is used to indicate that the information for that particular show is finished. A show information package may contain information for one or more shows depending on how many shows are broadcast within the four hour block. The presence of multiple shows is represented by 315 and 316.

FIG. 5 illustrates the organization of program schedule information according to an alternative embodiment of the present invention. As shown in FIG. 5, the database is structured internally as schedule data structures and theme data structures linked by handles and handle tables. Each handle is an index to a handle table which contains pointers to blocks of memory where structures of the database are stored.

The hierarchy for the schedule data structures, in descending order is as follows:

| | |
|---|---|
| Channel Data Table: | contains subscriber unit's list of channels; |
| Show List: | contains time slots for each show scheduled to be broadcast for a channel; |
| Show Title: | contains the title text and show title attributes; |
| Show Description: | contains show's ratings, attributes, and description text. |

A channel data table, depicted in FIG. 6, is typically the highest data structure in the hierarchy. This table includes an entry for each channel received by the television unit. The entries in the channel data table are changed infrequently and are determined by the location of the television unit and type of services received. The location of the television unit is entered into the television's memory during set up, when the user is requested to provide a zip code of the area where the television is located. Each channel data table entry includes information concerning the channel and a handle to a show list handle table for the channel.

The next data structure in the hierarchy is a show list as depicted in FIG. 7. The show list includes a start time, typically being midnight GMT, and 24 hours of scheduling. The channel's schedule is given by an ordered sequence of show slots, with a show slot for each show to be broadcast by a particular channel for a particular day. Each slot includes a duration, show title handle, and show description handle. Finding an entry corresponding to a given start time requires scanning the entries, in order, from the beginning of the show list and adding duration values.

In one embodiment, the database, when fully constructed, holds a week's worth of show lists for each channel. The days of the week are accessed by incrementing the show list handle by two bytes. The show lists are updated each day at midnight GMT with the show list for the day just completed being deleted and the show list for the same day next week being added to the database.

The next data structures in the schedule hierarchy are the show title entries, depicted in FIG. 8, and the show description entries, depicted in FIG. 9. For a given show slot, the show title entry and show description entry are accessed utilizing the handles included in the slot. The show title and show description entries are stored in a memory pool divided into blocks. Each show title is identified by a unique show identification number (SID), and each show description is identified by a unique number assigned at the head end. The show title handles are based on the SID and the show title handles are offsets into a show title handle table. The entry in the show title table accessed by a particular show title handle includes the address of the first block in the memory pool where the show title entry is stored. Similarly, the show description handle table entry accessed by a show description handle stores the address of the first block in the memory pool where the show description entry is stored.

As with television programming data, the television system also receives advertisement data in packets. The advertisement data is then stored in an advertisement (ad) database. The advertisements generally relate to future television programs. However, a person skilled in the art should recognize that the advertisements may also relate to general products, services and the like, and are not limited to future programming advertisements.

The advertisement data packets, according to one embodiment of the invention, comprise a scheduling component and a program component. The two components are transmitted by an information broadcasting system. FIG. 10 is an exemplary illustration of the scheduling component. As illustrated in FIG. 10, the scheduling component includes a Start Time and 24 hours worth of ad schedules. The Start Time is the time in which the advertisements are to be displayed, and can be any time during the day. Generally speaking, however, the Start Time of the ads is 12:00 am.

Following the Start Time is a Duration field and an Ad ID for each scheduled ad. The Duration field indicates the period for which a particular ad is to be displayed. In one embodiment, ad durations may range from 5 minutes to 24 hours. The Ad ID is utilized to access the ad copy (text & graphics) for a particular ad.

In addition to the schedule component, the information broadcasting system also transmits a program component. The program component allows the television system to link to an advertised show. FIG. 11 illustrates a program component according to one embodiment of the invention. As illustrated in FIG. 11, the program component includes an Ad ID, a Guide Channel, Start Time, and Duration. The Ad ID allows the Guide Channel, Start Time, and Duration fields to be associated with a particular advertisement. The television system utilizes the Guide Channel to find the program schedule information for that channel. The Start Time and Duration fields are used to find a particular program broadcast by the channel.

According to one embodiment, the Guide Channel, Start Time, and Duration information are transmitted in the order the advertisements are scheduled. For instance, the first Guide Channel, Start Time, and Duration are associated with the first scheduled advertisement, the second Guide Channel, Start Time, and Duration are associated with the second scheduled advertisement, and so forth. Thus, according to this alternative embodiment, the information broadcasting system need not transmit the corresponding Ad IDs.

FIG. 12 is an illustration of how information is retrieved from the ad and EPG databases. Beginning at the Start Time, the television system retrieves an Ad ID (Ad ID1 in this example), and locates the corresponding ad copy in the advertisement database. Each ad copy includes a text field and a pointer to a logo/graphics. The text field contains special tags which serve as placeholders for particular values. These placeholders might reserve space in the ad copy for the air time of an advertised show, an episode's title/description, or any other information available from the EPG database. Accordingly, advertisements may be modified based on the information stored in the EPG database, and it no longer becomes necessary to create new advertisements for different time zones or different episode descriptions.

The ad entry further includes a pointer to an ad logo, if appropriate. The ad logo includes a graphics file of a logo (e.g., the NBC logo) or any other graphics data that is to be displayed with the ad. The television system utilizes the program component to link advertisements to the corresponding television programs. This allows the television system to insert the appropriate information into the placeholders of the text of an advertisement. In addition, the linking of programs to advertisements allows a viewer to schedule a show for watching or viewing directly from the advertisement.

In linking advertisements to corresponding television programs according to one embodiment of the invention, the Guide Channel of the program component is used to locate a map of pointers for a particular channel, each pointer corresponding to a show information package that contains data for a four-hour block of television programming for that particular channel. The Duration field allows the system to retrieve a particular program information within in a show information package. When the particular program is located, the television system retrieves values necessary for inserting information into the placeholders of the corresponding advertisement. For instance, the program description may be retrieved from the show information package and inserted into a program description placeholder within the ad. Furthermore, the time in which the program is to air may be retrieved and inserted into an air-time placeholder.

According to one embodiment, the EPG database contains programming information for an entire week. In this case, the Guide Channel is used to locate a showlist handle table with a handle to a showlist for a particular channel for the current day. The Start Time and Duration fields are used to locate the appropriate show description entry.

In another embodiment of the invention, the program component is not sent as a packet, but is created within the television system based on information transmitted with the advertisements in the scheduling component. According to this embodiment, the information broadcasting system transmits with the scheduling component, the title of the program being searched for, a time range in which the show will be broadcast, and a network station indicator for finding the network station broadcasting the program. For instance, the ad may contain instructions to "link to NBC show 'Friends' on Thursday evening." With this information, the television system searches the EPG database for the show 'Friends,' and creates the program component for the corresponding ad. In this way, a television system capable of tuning to multiple NBC affiliates would select the channel of the NBC affiliate which the television system is in fact tuned to.

While the invention has been described with respect to particular illustrated embodiment, those skilled in the art and technology to which the invention pertains will have no difficulty devising variations which in no way depart from the spirit of the invention. For example, while the illustrated embodiments have been described in connection with modifying time and program descriptions for an advertisement of a future television program, it will be appreciated that other types of advertisement information may be modified if desired.

In addition, the modified advertisements may not only pertain to future television programs, but may be advertisements for any type of products or services. Information related to the advertised product and/or service, such as price, telephone number, point of sales, web site address, dates of promotions, and the like may also be modified based on the information stored in the EPG database. For example, if the web site address of a product distributor is changed, only the new web site address needs to be transmitted and then inserted to the appropriate field of the stored advertisement when it is displayed in the EPG. Alternatively, the web site address may be retrieved form the EPG database and combined with a portion of the stored advertisement. In another example, the advertisement rotation information such as starting time and duration, and frequency of display can be retrieved from the EPG database and combined with the advertisement content stored in the ad database for displaying in the EPG.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. A method of displaying a modified advertisement for a program, comprising:
   storing schedule information corresponding to the program in a schedule information database on a user device;
   selecting an advertisement corresponding to the program from an advertisement database located on the user device, wherein the advertisement includes at least one placeholder;
   inserting, local to the user device, the schedule information corresponding to the program from the schedule information database into the at least one placeholder to form a modified advertisement; and
   displaying the modified advertisement on the user device.

2. The method of claim 1, wherein the schedule information comprises at least one of time, date, channel, price, point of sales, title, and program description information for the program.

3. The method of claim 1, wherein the selected advertisement is selected based on at least one of viewer profile information, monitored user interests, other displayed content, a theme of the other displayed content, a recently tuned program, and a highlighted program listing in an electronic program guide.

4. The method of claim 1, further comprising:
   receiving a plurality of advertisements in a television telecast signal at the user device; and
   storing the plurality of advertisements in the advertisement database, wherein the selected advertisement is one of the plurality of advertisements.

5. The method of claim 1, further comprising:
   forming a link between the selected advertisement in the advertisement database and the schedule information for the program in the schedule information database; and
   providing a user of the user device with the ability to select the program for viewing based on the link.

6. A method of displaying a modified advertisement for a program, wherein the modified advertisement includes at least one schedule information item corresponding to the program, the method comprising:
   selecting an advertisement corresponding to the program from an advertisement database located on a user device, wherein the selected advertisement includes advertisement information and a placeholder for the at least one schedule information item;
   selecting the value of the at least one schedule information item from a schedule information database located on the user device;
   local to the user device, modifying the selected advertisement to replace the placeholder with the value selected from the schedule information database; and
   displaying the modified advertisement on the user device.

7. The method of claim 6, wherein the at least one schedule information item comprises at least one of time, date, channel, price, point of sales, title, and program description information for the program.

8. The method of claim 6, wherein the selected advertisement includes schedule information for the program other than the at least one schedule information item, the method further comprising searching for the at least one schedule information item in the schedule information database using the other schedule information.

9. The method of claim 8, wherein the other schedule information includes one or more of a title of the program, a time range in which the program will be broadcast, and a network station indicator.

10. User equipment, comprising:
a schedule information database for storing schedule information for a plurality of programs;
an advertisement database for storing a plurality of advertisements; and
a display screen for displaying at least one advertisement for a program to a user, wherein the at least one advertisement is selected from the advertisement database, the at least one advertisement including at least one placeholder, and wherein the at least one advertisement is modified prior to display by inserting, local to the user equipment, schedule information for the program retrieved from the schedule information database into the at least one placeholder.

11. The user equipment of claim 10, wherein the schedule information comprises at least one of time, date, channel, price, point of sales, title, and program description information for the program.

12. The user equipment of claim 10, wherein the at least one advertisement is selected based on at least one of viewer profile information, monitored user interests, other displayed content, a theme of the other displayed content, a recently tuned program, and a highlighted program listing in an electronic program guide.

13. The user equipment of claim 10, wherein the plurality of advertisements are received from a television telecast signal.

14. The user equipment of claim 10, wherein the at least one advertisement in the advertisement database is linked to the schedule information in the schedule information database, and wherein the user equipment further comprises a user input device for providing a user with the ability to select the program for viewing based on the link.

15. User equipment, comprising:
an advertisement database for storing a plurality of advertisements, wherein at least one advertisement in the advertisement database is for a program and includes a placeholder for at least one schedule information item for the program;
a schedule information database for storing a plurality of schedule information, wherein the schedule information comprises the at least one schedule information item for the program;
a display screen for displaying the at least one advertisement for the program, wherein the at least one advertisement is modified local to the user equipment prior to display to include the value of the at least one schedule information item retrieved from the schedule information database, and wherein the value of the at least one schedule information item is inserted into the placeholder.

16. The user equipment of claim 15, wherein the at least one schedule information item comprises at least one of time, date, channel, price, point of sales, title, and program description information for the program.

17. The user equipment of claim 15, wherein the at least one advertisement stored in the advertisement database includes schedule information for the program other than the at least one schedule information item, and wherein the other schedule information is used to locate the at least one schedule information item in the schedule information database.

18. The user equipment of claim 17, wherein the other schedule information includes one or more of a title of the program, a time range in which the program will be broadcast, and a network station indicator.

* * * * *